(12) United States Patent
Sakuda

(10) Patent No.: US 12,304,836 B2
(45) Date of Patent: May 20, 2025

(54) GRINDING WATER TREATMENT DEVICE FOR EYEGLASSES LENS PROCESSING

(71) Applicant: NIDEK CO., LTD., Aichi (JP)

(72) Inventor: Ryuma Sakuda, Aichi (JP)

(73) Assignee: NIDEK CO., LTD., Aichi (JP)

( * ) Notice: Subject to any disclaimer, the term of this patent is extended or adjusted under 35 U.S.C. 154(b) by 584 days.

(21) Appl. No.: 17/575,104

(22) Filed: Jan. 13, 2022

(65) Prior Publication Data
US 2022/0220011 A1 Jul. 14, 2022

(30) Foreign Application Priority Data

Jan. 14, 2021 (JP) ................... 2021-004346
Oct. 26, 2021 (JP) ................... 2021-174482

(51) Int. Cl.
*C02F 1/38* (2023.01)
*C02F 1/00* (2023.01)
*C02F 103/12* (2006.01)

(52) U.S. Cl.
CPC .............. *C02F 1/38* (2013.01); *C02F 1/001* (2013.01); *C02F 2103/12* (2013.01); *C02F 2301/026* (2013.01); *C02F 2301/08* (2013.01)

(58) Field of Classification Search
CPC .... B04B 1/02; B04B 3/00; B04B 7/16; B04B 11/02; B04B 11/05; B04B 11/08;
(Continued)

(56) References Cited

U.S. PATENT DOCUMENTS 5,252,202 A * 10/1993 Hirose .................. C02F 1/385
494/58
5,338,459 A 8/1994 Hirose
7,650,998 B2 1/2010 Tanaka et al.

FOREIGN PATENT DOCUMENTS

CN 105921290 A * 9/2016 ............... B04B 1/02
CN 104128265 B * 3/2017
(Continued)

OTHER PUBLICATIONS

Communication dated Jun. 10, 2022 issued by the European Patent Office in EP Application No. 22151273.4.
(Continued)

*Primary Examiner* — Bobby Ramdhanie
*Assistant Examiner* — Boi-Lien Thi Nguyen
(74) *Attorney, Agent, or Firm* — Sughrue Mion, PLLC

(57) ABSTRACT

A grinding water treatment device for eyeglasses lens processing includes a centrifugal separator, a scraping unit, an opening, and a filter. The centrifugal separator includes a dehydration tank into which grinding water used in a processing device of an eyeglasses lens is introduced, and separates the grinding water into water and processing chips by rotation of the dehydration tank. The scraping unit scrapes out the processing chips accumulated on a side wall inside the dehydration tank. The opening is provided in the dehydration tank and through which the processing chips scraped out by the scraping unit are ejected to an outside of the dehydration tank. The filter is provided in an outer region of the opening, and through which the water separated from the grinding water by rotation of the dehydration tank passes to allow the processing chips to be present inside the dehydration tank.

11 Claims, 11 Drawing Sheets

(58) Field of Classification Search
CPC ........ C02F 1/38; C02F 1/001; C02F 2103/12; C02F 2301/026; C02F 2301/08; C02F 2303/24; C02F 1/385; C02F 9/00; C02F 1/32; C02F 1/66; C02F 1/441; C02F 1/444; C02F 1/52; C02F 1/78; C02F 1/20; C02F 1/283; C02F 1/42; C02F 1/44; C02F 2103/346; C02F 2209/06; C02F 1/008; C02F 1/281; C02F 1/725; C02F 2103/02; C02F 2209/11; C02F 1/004; C02F 1/02; C02F 1/463; C02F 1/722; C02F 2103/08; C02F 2103/365; C02F 2201/008; C02F 2209/02; C02F 1/442; C02F 1/4672; C02F 1/48; C02F 11/147; C02F 2001/007; C02F 2101/10; C02F 2101/20; C02F 2305/10; C02F 1/28; C02F 1/36; C02F 1/56; C02F 1/68; C02F 1/74; C02F 1/76; C02F 2101/32; C02F 2103/06; C02F 2209/00; C02F 2209/005; C02F 2209/006; C02F 2209/008; C02F 2209/04; C02F 2303/04; C02F 2303/16; C02F 3/082; C02F 1/24; C02F 1/325; C02F 1/40; C02F 1/5245; C02F 1/705; C02F 11/12; C02F 11/121; C02F 2101/106; C02F 2101/12; C02F 2101/303; C02F 2101/322; C02F 2101/325; C02F 2101/36; C02F 2101/363; C02F 2101/38; C02F 2103/18; C02F 2201/009; C02F 2201/3223; C02F 2201/328; C02F 2201/461; C02F 2201/4612; C02F 2301/024; C02F 2303/26; C02F 1/30; C02F 1/50; C02F 2101/103; C02F 2101/108; C02F 2101/16; C02F 2101/163; C02F 2101/203; C02F 2101/22; C02F 2103/22; C02F 2209/05; C02F 2209/22; C02F 2209/23; C02F 2209/42; C02F 5/14; C02F 1/285; C02F 1/34; C02F 1/4618; C02F 1/5272; C02F 1/72; C02F 1/727; C02F 11/02; C02F 11/086; C02F 11/143; C02F 2001/5218; C02F 2103/026; C02F 2103/04; C02F 2103/10; C02F 2201/4613; C02F 2209/03; C02F 2209/07; C02F 2209/16; C02F 2209/18; C02F 2209/44; C02F 2301/022; C02F 3/006; C02F 3/32; C02F 3/34; C02F 1/00; C02F 1/005; C02F 1/006; C02F 1/046; C02F 1/10; C02F 1/12; C02F 1/288; C02F 1/302; C02F 1/4608; C02F 1/4691; C02F 1/4695; C02F 1/487; C02F 1/5236; C02F 1/5281; C02F 1/70; C02F 11/00; C02F 11/008; C02F 11/04; C02F 11/15; C02F 11/16; C02F 11/185; C02F 2001/422; C02F 2001/425; C02F 2001/46138; C02F 2001/46142; C02F 2001/46147; C02F 2001/46152; C02F 2001/46161; C02F 2101/327; C02F 2103/008; C02F 2103/14; C02F 2103/20; C02F 2103/32; C02F 2103/24; C02F 2201/001; C02F 2201/007; C02F 2201/4611; C02F 2201/46135; C02F 2201/46145; C02F 2201/46155; C02F 2201/46175; C02F 2201/4618; C02F 2201/4619; C02F 2201/782; C02F 2203/006; C02F 2209/10; C02F 2209/105; C02F 2209/40; C02F 2301/046; C02F 2303/10; C02F 2303/20; C02F 2305/08; C02F 2307/06; C02F 2307/10; C02F 3/02; C02F 3/04; C02F 3/1273; C02F 3/282; C02F 3/284; C02F 3/286; C02F 3/307; C02F 3/341; C02F 5/145; B24B 9/146; B24B 55/03

See application file for complete search history.

(56) References Cited

FOREIGN PATENT DOCUMENTS

| | | | | |
|---|---|---|---|---|
| CN | 208050182 U | * | 11/2018 | |
| EP | 2172303 A1 | * | 4/2010 | ............... B04B 1/02 |
| GB | 2572331 B | * | 3/2022 | ......... B01D 17/0217 |
| JP | 2-251259 A | | 10/1990 | |
| JP | 5-138174 A | | 6/1993 | |
| JP | 7-275737 A | | 10/1995 | |
| JP | 9-47687 A | | 2/1997 | |
| JP | 2002283236 A | * | 10/2002 | |
| JP | 2004-243452 A | | 9/2004 | |
| JP | 2005-153134 A | | 6/2005 | |
| JP | 2008-178969 A | | 8/2008 | |
| JP | 2008-246599 A | | 10/2008 | |
| JP | 2013-94743 A | | 5/2013 | |
| JP | 2013-94746 A | | 5/2013 | |
| JP | 2013094743 | * | 5/2013 | |
| WO | 02/089993 A1 | | 11/2002 | |

OTHER PUBLICATIONS

Office Action dated Aug. 21, 2023, issued by the European Patent Office in counterpart European Patent Application No. 22151273.4.

\* cited by examiner

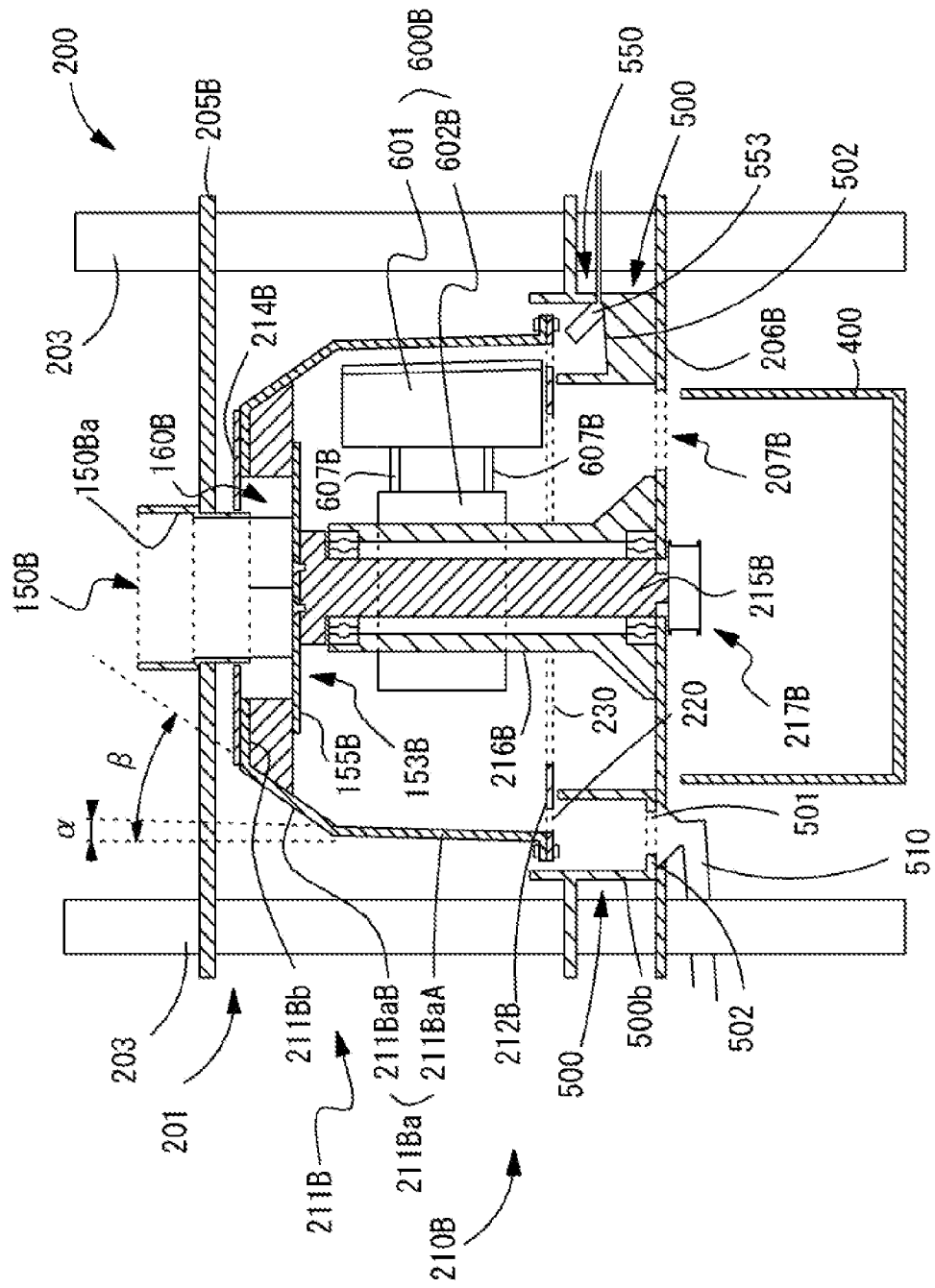

GRINDING WATER TREATMENT DEVICE FOR EYEGLASSES LENS PROCESSING

CROSS-REFERENCE TO RELATED APPLICATION

This application claims priority from Japanese Patent Applications No. 2021-004346 filed on Jan. 14, 2021 and No. 2021-174482 filed on Oct. 26, 2021, the entire subject-matters of which are incorporated herein by reference.

TECHNICAL FIELD

The present disclosure relates to a grinding water treatment device for eyeglasses lens processing, which separates and treats processing chips from grinding water discharged from a processing device of an eyeglasses lens.

BACKGROUND

As a grinding water treatment device for eyeglasses lens processing, a device that separates and treats processing chips and water by using a centrifugal separator is known (refer to JP-A-2002-283236 and JP-A-2005-153134). In a centrifugal separator of JP-A-2002-283236, water is separated by repelling water from an opening opened at an upper portion of a dehydration tank by rotating the dehydration tank. In a centrifugal separator of JP-A-2005-153134, a conical filter is supported by a support frame inside a rotating dehydration tank, and water is filtered outward to be separated by the filter rotated together with the dehydration tank.

However, in the centrifugal separators disclosed in JP-A-2002-283236 and JP-A-2005-153134, it is necessary for an operator to frequently take out the processing chips accumulated inside the dehydration tank, which makes the work troublesome and inefficient.

SUMMARY

An object of the present disclosure is to provide a grinding water treatment device for eyeglasses lens processing, which enables to efficiently and appropriately treat grinding water and processing chips.

A grinding water treatment device for eyeglasses lens processing, including:
- a centrifugal separator that includes a dehydration tank into which grinding water used in a processing device of an eyeglasses lens is introduced, and separates the grinding water into water and processing chips by rotation of the dehydration tank;
- a scraping unit that scrapes out the processing chips accumulated on a side wall inside the dehydration tank;
- an opening provided in the dehydration tank and through which the processing chips scraped out by the scraping unit are ejected to an outside of the dehydration tank; and
- a filter provided in an outer region of the opening, and through which the water separated from the grinding water by rotation of the dehydration tank passes to allow the processing chips to be present inside the dehydration tank.

BRIEF DESCRIPTION OF DRAWINGS

FIG. 8 is a view describing a configuration of a grinding water treatment device according to another example.

DETAILED DESCRIPTION

[Overview]

Figure 1:
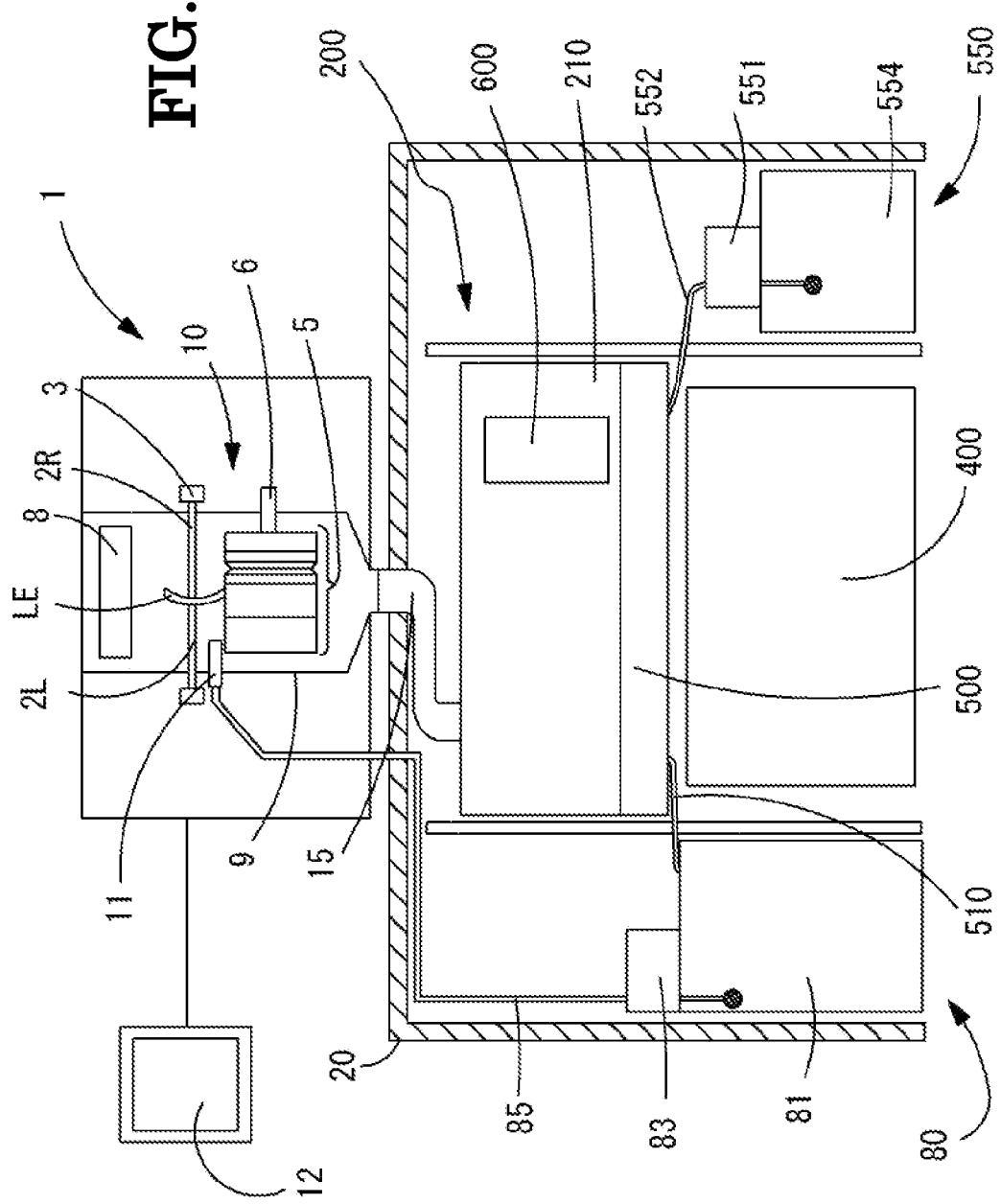
FIG. 1 is a view illustrating a schematic configuration of the whole of an eyeglasses lens processing apparatus according to an example.

An embodiment of a grinding water treatment device for eyeglasses lens processing according to the present disclosure will be described. The items classified by < > below can be used independently or in association with each other.

The grinding water treatment device exemplified in the present disclosure (for example, a grinding water treatment device 200) includes a centrifugal separator (for example, centrifugal separators 210 and 210B). For example, the centrifugal separator includes a dehydration tank (for example, dehydration tanks 211 and 211B). For example, grinding water that has been used is introduced into the dehydration tank from a processing device (for example, a processing device 1) of an eyeglasses lens. For example, the centrifugal separator separates the grinding water into water and processing chips by rotation of the dehydration tank. For example, the centrifugal separator includes a scraping unit (for example, scraping mechanism units 600 and 600B). For example, the centrifugal separator may include a grinding water introducing unit (for example, a grinding water introduction pipe 150 and a grinding water introduction unit 150B). For example, the centrifugal separator may include a wash water injection unit (for example, a wash water injection unit 550) that ejects wash water.

For example, the grinding water treatment device may include a water receiving unit (for example, a water receiving unit 500) that receives water discharged from the dehydration tank, which is water separated by the rotation of the dehydration tank. For example, the grinding water treatment device may include a grinding water tank (for example, a tank 81) for storing the grinding water supplied to the processing device. For example, the water separated from the grinding water is discharged into the grinding water tank by a centrifugal separator, and accordingly, the grinding water is repeatedly used by the processing device. For example, the grinding water treatment device may include a notification unit (for example, a monitor 12).

<Scraping Unit>

The scraping unit is configured to scrape out the processing chips accumulated inside the dehydration tank. For example, the scraping unit includes a scraper (for example, a scraper 601) which is a member for scraping out the processing chips accumulated on an interior side of a side wall inside the dehydration tank. For example, the scraper is disposed inside the dehydration tank. For example, the scraper has a shape capable of scraping out the processing chips accumulated on the interior side of the side wall inside the dehydration tank. For example, the scraper includes a cutting edge portion (for example, a cutting edge portion 601a) having a shape along an interior wall of the side wall inside the dehydration tank. For example, the scraping unit includes a moving mechanism (for example, moving mechanisms 602 and 602B) for moving the scraper between a retracted position and an operating position for scraping out the processing chips.

<Dehydration Tank>

For example, the dehydration tank includes a substantially cylindrical side wall (for example, side walls 211a and 211Ba). The side wall inside the dehydration tank may have a conical shape of which the lower diameter is larger than that of the upper diameter. It is needless to say that the shape of the dehydration tank is not limited to these shapes. For example, the shape of the dehydration tank may be any shape as long as the grinding water can be separated into processing chips and water by the rotation of the dehydration tank.

For example, the rotation shaft of the dehydration tank may be rotatably held by a holding member (for example, a holding member 216) provided in a support mechanism (for example, a support mechanism 201) positioned at the upper portion of the dehydration tank. Then, the lower portion of the rotation shaft (for example, a rotation shaft 215) may be fixed to the bottom portion (for example, a bottom plate 212) of the dehydration tank. The dehydration tank is rotated by the rotation of the rotation shaft.

For example, the rotation shaft of the dehydration tank may be rotatably held by a holding member (for example, a holding member 216B) provided in a support mechanism (for example, a base 206B) positioned at the lower portion of the dehydration tank. Then, a coupling member (for example, a coupling member 162B) for coupling the upper portion (for example, an upper wall 211Bb and a second side wall 211BaB) of the dehydration tank and the rotation shaft may be provided.

For example, an upper wall (for example, an upper wall 211b) may be provided at the upper portion of the dehydration tank. For example, the upper wall is formed in an annular shape. For example, in a case where the rotation shaft of the dehydration tank extending from the upper portion of the dehydration tank, the moving shaft of the scraping unit, and the grinding water introduction pipe are disposed inside the annular shape of the upper wall, the dehydration tank is rotated without interfering with these. For example, the upper wall is formed so as to extend in the horizontal direction from the upper end of the side wall inside the dehydration tank. It is needless to say that the shape of the upper wall is not limited thereto. For example, the upper wall may be inclined such that the rotation center side of the dehydration tank is higher than the upper portion of the side wall. Further, the upper wall may not necessarily have to be provided. For example, the upper portion of the side wall may be inclined toward the center of rotation and the side wall may also serve as the upper wall such that the bottom portion and the side wall inside the dehydration tank secure a region where processing chips are accumulated.

For example, the dehydration tank is provided with an opening (for example, opening 230). For example, the opening is provided to eject the processing chips scraped out by the scraping unit to the outside of the dehydration tank. For example, the opening is formed at the bottom portion of the dehydration tank such that the dropped processing chips scraped out by the scraping unit can pass through the opening. Since this opening is formed at the bottom portion of the dehydration tank, the processing chips scraped out by the scraping unit and naturally dropped can pass through the opening and be ejected to the outside of the dehydration tank. Therefore, the processing chips accumulated in the dehydration tank can be efficiently and appropriately treated. In addition, for example, in a case where the opening is provided at the bottom portion of the dehydration tank, a chips receiving unit (for example, a chips receiving unit 400) may be provided under the opening. In addition, the opening may be provided at the upper portion of the dehydration tank.

For example, the grinding water treatment device is provided with a filter (for example, a filter 220). For example, the filter is provided in the dehydration tank. The filter allows water separated from the grinding water by the rotation of the dehydration tank to pass therethrough, and allows the processing chips to be accumulated (present) inside the dehydration tank. For example, the filter can be disposed at various positions. For example, the filter is provided in the outer region (region outside the opening) of the opening for ejecting the processing chips. For example, the filter may be provided in the outer region of the opening at a position where the processing chips can be accumulated inside the dehydration tank. For example, the filter is provided at the bottom portion of the dehydration tank. In addition, the filter may be provided at the upper portion of the dehydration tank. For example, the filter may be provided between the opening for ejecting the processing chips and the side wall inside the dehydration tank. For example, the filter may be in the form of a mesh.

In the present disclosure, for example, since the filter is provided in the outer region of the opening for ejecting the processing chips, the water centrifugally separated inside the dehydration tank goes out of the dehydration tank through the filter, and thus, it is possible to suppress the discharge of the water in the dehydration tank from the opening. Accordingly, it is possible to suppress the mixing of the water into the processing chips ejected from the opening by the scraping unit, and the processing chips can be efficiently and appropriately treated.

In addition, in a case where the grinding water contains processing chips lighter than water, the water separated by centrifugal separation is positioned on the side wall side of the dehydration tank. In this case as well, the centrifugally separated water is discharged to the outside of the dehydration tank through the filter, and the processing chips are accumulated inside the dehydration tank. Accordingly, the processing chips accumulated inside the dehydration tank can be efficiently dehydrated, and the processing chips can be appropriately treated.

Further, for example, since the filter is provided in the outer region of the opening and at the bottom portion of the dehydration tank, even in a case where the rotation of the dehydration tank is stopped due to insufficient dehydration of the processing chips, the water remaining inside the dehydration tank passes through the filter and is discharged. Accordingly, it is possible to further suppress the outflow of water from the opening provided at the bottom portion of the dehydration tank, and it is possible to appropriately treat the processing chips.

In addition, in a case where the opening for ejecting the processing chips from the dehydration tank is provided at the upper portion of the dehydration tank, and in a case where the filter is disposed at the bottom portion of the dehydration tank, the filter may be provided at least in the outer region of the opening. As an example of the arrangement of the filter in this case, the filter may be disposed on the entire surface of the bottom portion of the dehydration tank.

Further, the filter is provided for accumulating the processing chips in the dehydration tank and discharging the water to the outside of the dehydration tank, and the arrangement of the filter is not limited to the dehydration tank as long as the function thereof is fulfilled. For example, the filter may be disposed between the water receiving unit and the dehydration tank described later. It is needless to say that the filter may be disposed above the water receiving unit. In this case, a seal may be provided to prevent the water or processing chips from flowing out between the filter and the dehydration tank.

<Grinding Water Introducing Unit>

For example, the grinding water introducing unit introduces the grinding water from the processing device into the dehydration tank. For example, the grinding water introducing unit is configured with a flow path for introducing the grinding water into the dehydration tank. For example, the grinding water introducing unit is provided so as to discharge the grinding water toward the interior side of the side wall inside the dehydration tank. Accordingly, it is possible to suppress the direct entrance of the grinding water discharged from the grinding water introducing unit to the opening for ejecting the processing chips. Further, since the grinding water is directed toward the interior side of the side wall, the grinding water is easily subjected to the action of centrifugal separation, and the processing chips and water are efficiently separated by centrifugal separation.

In addition, "discharging the grinding water toward the interior side of the side wall inside the dehydration tank" by the grinding water introducing unit of the present disclosure includes discharging the grinding water toward the interior side of the side wall inside the dehydration tank, and the discharged grinding water hits not only the side wall.

For example, in a case where the upper wall extending from the side wall inside the dehydration tank is provided so as to be inclined such that the rotation center side of the dehydration tank is higher than the upper portion of the side wall, the grinding water is discharged toward the interior side of the side wall inside the dehydration tank, and accordingly, the grinding water may hit the upper wall. According to this, the time required for the grinding water to be transferred along the side wall inside the dehydration tank and reach the filter is longer, and thus, the time for receiving the centrifugal force due to the rotation of the dehydration tank is increased, and as a result, the water and processing chips can be more efficiently separated from the grinding water.

For example, the grinding water introducing unit includes a grinding water introduction pipe for introducing the grinding water into the dehydration tank. For example, the discharge port of the grinding water introduction pipe is arranged on the side wall side of the dehydration tank with respect to the opening provided in the dehydration tank. Accordingly, it is further suppressed that the grinding water enters the opening for allowing the processing chips to pass therethrough.

In addition, for example, the grinding water introduction pipe extends inward from the upper portion of the dehydration tank, and the grinding water is dropped due to gravity. Further, the discharge port of the grinding water introduction pipe may be directed toward the interior side of the side wall inside the dehydration tank such that the grinding water is discharged toward the interior side of the side wall inside the dehydration tank. Accordingly, the grinding water is discharged toward the interior side of the side wall inside the dehydration tank by utilizing the force of the natural drop of the grinding water without using a pump.

Further, the cross-sectional area of the discharge port of the grinding water introduction pipe may be smaller than the cross-sectional area of the introduction port of the grinding water introduction pipe. Accordingly, the force of the grinding water emitted from the discharge port toward the interior side of the side wall inside the dehydration tank is gained, the grinding water is less likely to flow into the opening that allows the processing chips to pass therethrough, and the centrifugal separation by the rotation of the dehydration tank can be efficiently performed. In addition, accordingly, it is possible to contribute to the miniaturization of the dehydration tank.

Further, the direction of the discharge port of the grinding water introduction pipe may be directed not in the normal direction of the side wall inside the dehydration tank but in the direction in which the discharged grinding water heads along the rotation direction of the dehydration tank. Accordingly, when the grinding water discharged from the discharge port collides with the side wall inside the rotating dehydration tank, the accumulated processing chips, or the grinding water collected on the side wall side, bouncing and scattering are suppressed. As a result, it is possible to further suppress the entrance of the grinding water into the opening for ejecting the processing chips.

In one example of the present disclosure, since the opening for ejecting the processing chips is provided at the bottom portion of the dehydration tank, there is a new problem that the grinding water introduced from the grinding water introduction pipe enters the opening. In order to alleviate this problem, in the present disclosure, the arrangement of the grinding water introduction pipe inside the dehydration tank is devised as described above.

Further, for example, the grinding water introducing unit may have a grinding water receiving unit (for example, a grinding water receiving unit 153B). The grinding water discharged from the processing device is introduced (charged) into the grinding water receiving unit. For example, the grinding water receiving unit is disposed inside the dehydration tank. For example, the grinding water introducing unit may include a rotation unit (for example, a rotation unit 217B) that rotates the grinding water receiving unit in a direction identical to the rotation direction of the dehydration tank. Furthermore, the grinding water receiving unit may be rotated integrally with the dehydration tank. Then, a discharge opening (for example, a discharge opening 160B) for discharging the grinding water toward the interior side of the side wall inside the dehydration tank may be provided on the outer periphery of the grinding water receiving unit. In this case, since the grinding water receiving unit is rotated in the same direction as the rotation direction of the dehydration tank, centrifugal force also acts on the grinding water received by the grinding water receiving unit, the grinding water is vigorously discharged (emitted) from the outer periphery of the discharge opening, and a force in the rotation direction acts on the grinding water discharged from the discharge opening at the same time. Accordingly, the generation of splashes (sprays) when the grinding water collides with the side wall (or the wall of the grinding water collected on the side wall) inside the dehydration tank that rotates at high speed is suppressed. In addition, the inhibition of centrifugal separation between the processing chips and water related to the grinding water collected on the side wall is suppressed, and the centrifugal separation between the processing chips and water is efficiently performed.

For example, the rotation unit of the grinding water receiving unit may be rotated integrally with the dehydration tank by being shared with the rotation unit (for example, a rotation unit 217B) of the dehydration tank. Further, the grinding water receiving unit may be attached to the rotation shaft (for example, a rotation shaft 215B) of the dehydration tank. The grinding water receiving unit may have a bottomed water receiving plate (for example, a water receiving plate 155B) that receives the grinding water discharged from the processing device, and a plurality of coupling members (for example, coupling members 162B) for coupling the water receiving plate and the dehydration tank. In this case, the discharge opening may be formed between the plurality of coupling members. Further, the coupling member may be integrally formed with the dehydration tank and the grinding water receiving unit.

For example, in a case where the grinding water introducing unit has a grinding water receiving unit, the dehydration tank has a two-stage structure including a first side wall (for example, a first side wall 211BaA) provided at a lower part of the dehydration tank and a second side wall (for example, a second side wall 211BaB) provided above the first side wall. For example, the first side wall may have a cylindrical surface or a conical surface of which the upper diameter is smaller than the lower diameter, the second side wall may have a conical surface of which the upper diameter is smaller than the lower diameter, and the angle formed by the conical surface of the second side wall with respect to the vertical direction may be larger than the angle formed by the cylindrical surface or the conical surface of the first side wall with respect to the vertical direction. In this case, the discharge opening may be positioned above the first side wall. For example, the discharge opening may be positioned between the heights of the conical surface of the second side wall.

<Water Receiving Unit>

For example, the water receiving unit includes a region for receiving water that has passed through the filter of the dehydration tank. For example, the water receiving unit is disposed below the filter. For example, the water receiving unit includes a drainage hole (for example, a drainage hole 501) for storing the water that has passed through the filter and discharging the water to a tank (for example, a tank 81) for storing the grinding water. For example, the water receiving unit may be disposed at least in a region other than the region of a part where the processing chips scraped out by the scraping mechanism unit pass through the opening. For example, the water receiving unit is disposed outside the opening for allowing the processing chips to pass therethrough.

<Wash Water Injection Unit>

For example, the wash water injection unit has a nozzle (for example, a nozzle 553) for ejecting wash water toward the filter of the dehydration tank. For example, the wash water injection unit is driven after the processing chips of the dehydration tank are scraped out by the scraping unit. Accordingly, the clogging of the filter is eliminated and the grinding water can be treated well.

For example, the wash water injection unit may include a tank into which the wash water enters is supplied, in addition to the tank in which the grinding water is stored. In this case, regarding the wash water in the tank, by driving the pump, the wash water is pumped up from the tank, and the wash water is injected from the nozzle.

For example, the nozzle is provided at a position where the wash water is ejected from below the filter. In this case, the tip end port of the nozzle may be provided so as to eject the wash water in the diagonally downward direction with respect to the filter at a position avoiding the position where the water that has passed through the filter is dropped. Accordingly, it is possible to suppress the direct entrance of the water that has passed through the filter into the tip end port of the nozzle when the wash water is not injected, and it is possible to suppress the clogging of the nozzle due to the fine processing chips that have passed through the filter. In addition, the mechanism for suppressing the clogging of the nozzle is not limited thereto. For example, the nozzle may be provided with a mechanism which is positioned at the retracted position that is not affected by the water that has passed through the filter during non-washing, and moves from the retracted position to the injection position where the wash water can be ejected toward the filter during the washing. Otherwise, the nozzle may be provided inside the dehydration tank. In this case, the nozzle injects the wash water from above the filter.

<Arrangement of Each Mechanism with Respect to Dehydration Tank>

For example, the holding unit of the rotation shaft for rotating the dehydration tank and the rotation transmission mechanism may be disposed at the upper portion of the dehydration tank, and the moving mechanism for moving the scraper of the scraping unit may also be disposed at the upper portion of the dehydration tank. Furthermore, the grinding water introduction pipe may be inserted from the upper portion of the dehydration tank. In other words, in this case, these components are not disposed below the opening provided at the bottom portion of the dehydration tank. Therefore, these components do not hinder the ejection of the processing chips, and the processing chips can be treated well.

It is needless to say that the arrangement of the holding unit of the rotation shaft and the rotation transmission mechanism is not limited thereto, and the rotation transmission mechanism may be disposed below the dehydration tank. The moving mechanism for moving the scraper may be disposed inside or at the lower portion of the dehydration tank. In this case, a coupling member for coupling the dehydration tank can be provided at the upper portion of the rotation shaft of the dehydration tank. Accordingly, accumulation of the processing chips that are dropped when the scraper of the scraping unit is operated on the coupling member for coupling the dehydration tank is avoided, and the processing chips can be easily processed.

<Notification Unit>

For example, the notification unit is provided to notify the operator of various types of information. For example, the notification unit notifies an error of the grinding water treatment device, work information necessary for the operator, and the like. For example, the notification unit may also be used as a monitor (for example, a monitor 12) which is an example of a display unit provided in the processing device. Accordingly, even in a case where the centrifugal separator is accommodated inside the table, the necessary information can be notified to the operator by using the display unit which is an example of the notification unit of the processing device. For example, the notification unit is provided to notify the operator of the status in a case where the centrifugal separator does not operate normally. According to this, when the centrifugal separator does not operate normally, the operator is required to take action, and thus, the processing chips can be treated well.

EXAMPLE

Examples of the present disclosure will be described with reference to the drawings.

First Example

FIG. 1 is a view illustrating a schematic configuration of the whole of an eyeglasses lens processing apparatus according to the first example. The eyeglasses lens processing apparatus includes a processing device 1 of an eyeglasses lens and a grinding water treatment device 200. For example, the processing device 1 is placed on the table 20, and the grinding water treatment device 200 is disposed under the table 20.

<Processing Device of Eyeglasses Lens>

A processing mechanism unit 10 is disposed inside the housing of the processing device 1. The processing mechanism unit 10 is substantially configured with lens chuck shafts (lens rotating shafts) 2R and 2L, a carriage unit 3, a grindstone 5 which is an example of a machining tool, and the like. The lens chuck shafts (lens rotating shafts) 2R and 2L hold and rotate a lens LE for eyeglasses. The carriage unit 3 moves the lens chuck shafts 2R and 2L relative to the grindstone 5. The grindstone 5 is attached to a rotation shaft 6 and is rotated by the rotation shaft 6. Further, a lens refractive surface shape measuring unit 8 is disposed inside the processing device 1. The lens refractive surface shape measuring unit 8 measures the shape of the refractive surface (front surface and rear surface of the lens) of the lens LE held by the lens chuck shafts 2R and 2L. In addition, for the configuration of the processing mechanism unit 10 and the lens refractive surface shape measuring unit 8, for example, the description of JP-A-2014-4677 is incorporated, and detailed description thereof will be omitted.

At the time of peripheral processing of the lens LE, the grinding water is injected from a nozzle 11 to the grinding part of the lens LE and the grindstone 5, and the grinding unit of the grindstone 5 is cooled. Further, the processing chips generated during the processing is washed away to the bottom portion of a processing chamber 9 by the grinding water. A drainage hose 15 for discharging the grinding water containing processing chips are connected to the bottom portion of the processing chamber 9.

<Grinding Water Treatment Device>

The grinding water treatment device 200 includes the centrifugal separator 210 that separates the grinding water discharged from the processing device 1 into processing chips and water. The centrifugal separator 210 is provided with the scraping mechanism unit 600 for scraping out the past chips accumulated inside the dehydration tank 211 (refer to FIG. 2) of the centrifugal separator 210. Further, the grinding water treatment device 200 includes the water receiving unit 500 that receives water separated and discharged by the centrifugal separator 210. In addition, there is also a case where the grinding water is completely separated into the water and the processing chips.

The grinding water treatment device 200 may include the wash water injection unit 550 for injecting the wash water in order to wash a filter 220 (refer to FIG. 2) provided in the centrifugal separator 210. Further, the grinding water treatment device 200 may include a pump tank unit 80 for storing the grinding water supplied to the processing device 1. At the lower portion of the centrifugal separator 210, the chips receiving unit (bucket) 400 that receives the processing chips separated and ejected by the centrifugal separator is detachably disposed.

<Pump Tank Unit>

The pump tank unit 80 includes the tank 81 for storing the grinding water and the pump 83 for pumping up the grinding water stored in the tank 81. Water from the water receiving unit 500 is charged into the tank 81, and the water separated by the centrifugal separator 210 is reused as grinding water. In the present example, the pump tank unit 80 is a circulation type in which the grinding water is reused. The grinding water pumped up by the pump 83 is guided to the nozzle 11 of the processing device 1 by the hose 85.

<Centrifugal Separator>

Figure 2:
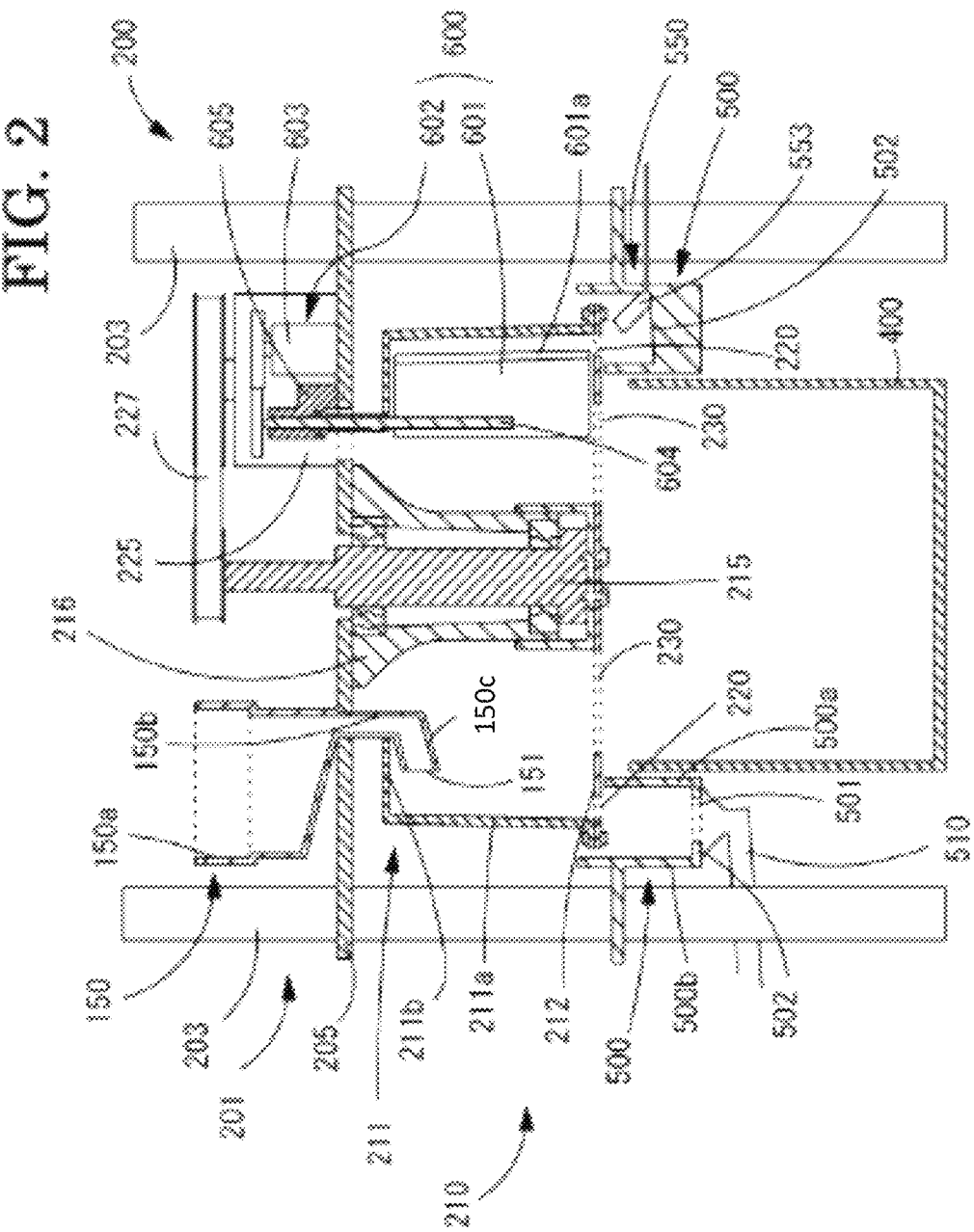
FIG. 2 is a schematic sectional view for describing a configuration of a centrifugal separator and a water receiving unit.

The configuration of the centrifugal separator 210 will be described with reference to FIGS. 2 to 5. In addition, FIG. 2 is a schematic sectional view for describing a configuration of the water receiving unit 500 in addition to the centrifugal separator 210.

The centrifugal separator 210 includes the dehydration tank 211 into which the used grinding water from the processing device 1 is introduced. The dehydration tank 211 is rotatably supported by the support mechanism 201. For example, the support mechanism 201 includes four columns 203, and a top plate 205 is fixed to the four columns 203. The dehydration tank 211 is disposed below the top plate 205. The holding member 216 that rotatably holds the rotation shaft 215 of the dehydration tank 211 is fixed to the top plate 205. The rotation shaft 215 is rotated by a drive source disposed above the dehydration tank 211. For example, the rotation shaft 215 is rotated by a motor 225 disposed on the top plate 205 via a rotation transmission mechanism 227. As the rotation transmission mechanism 227, a mechanism such as a belt, a pulley, or a gear is used.

For example, the dehydration tank 211 includes the substantially cylindrical side wall 211a. In the example, the side wall 211a has a conical shape having a larger lower diameter than an upper diameter. The upper wall 211b of the dehydration tank 211 has an annular shape and is integrally connected to the side wall 211a. The holding member 216 is disposed through the opening inside the annular upper wall 211b.

The bottom plate 212 is attached to the bottom portion of the side wall 211a of the dehydration tank 211. The bottom plate 212 configures the bottom portion of the dehydration tank 211. In addition, the bottom plate 212 may be detachably attached to the side wall 211a.

Figure 3:
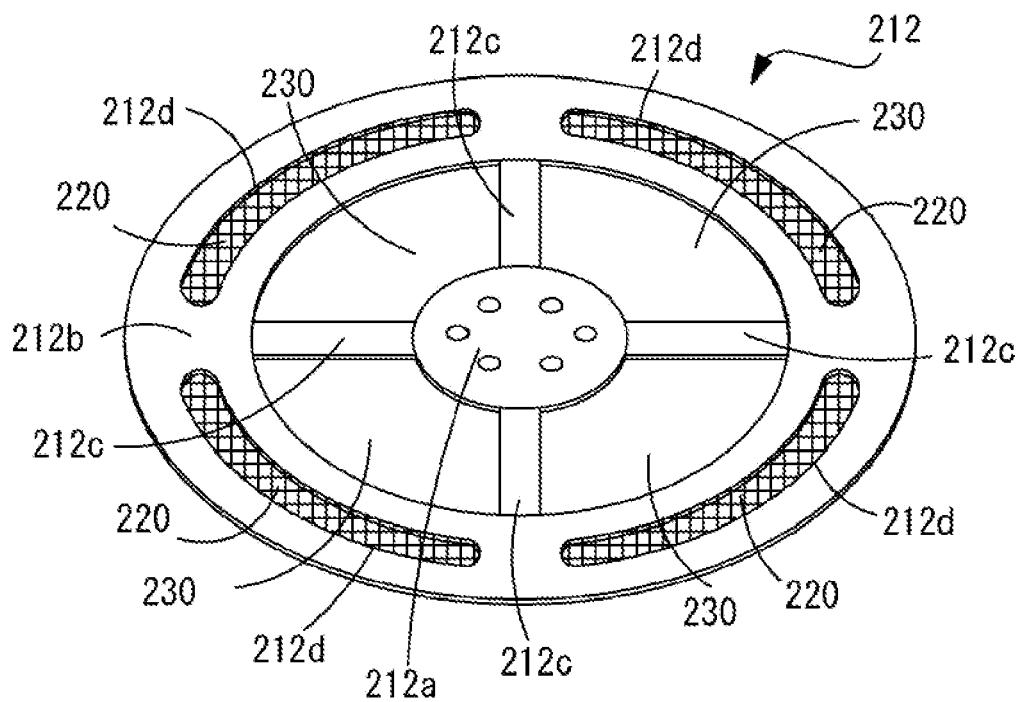
FIG. 3 is a perspective view describing a configuration of a bottom plate.

FIG. 3 is a perspective view describing a configuration of the bottom plate 212. The rotation shaft 215 is fixed to a center portion 212a of the bottom plate 212. For example, the center portion 212a and the lower end of the rotation shaft 215 are fixed. The bottom plate 212 is provided with the opening 230 for allowing the dropped processing chips scraped out by the scraping mechanism unit 600 to pass therethrough and ejecting the processing chips to the outside of the dehydration tank 211. In the present example, four coupling units 212c that couples a peripheral portion 212b and the center portion 212a of the bottom plate 212 are formed, and four openings 230 are provided therebetween. It is needless to say that the number of coupling units 212c and the number of openings 230 are examples, and are not limited thereto. For example, the coupling unit 212c extends in the cross direction. In addition, the peripheral portion 212b becomes a region where processing chips are accumulated in cooperation with the side wall 211a and the upper wall 211b. With such a configuration, the rotation shaft 215 is rotated by the motor 225, and accordingly, the dehydration tank 211 is also rotated. In addition, the coupling unit 212c may not have to be integrated with the peripheral portion 212b and the center portion 212a, and may be another coupling member for coupling the member of the peripheral portion 212b and the member of the center portion 212a so as to form the opening 230.

The peripheral portion 212b, which is the outer region of the opening 230, is provided with the filter 220 for allowing the water separated from the grinding water to pass therethrough by the rotation of the dehydration tank 211 and discharging the water to the outside of the dehydration tank 211. In other words, the filter 220 is provided between the opening 230 for ejecting the processing chips and the side wall 211a of the dehydration tank 211. In the example, four elongated holes 212d are formed in the peripheral portion 212b, and the filter 220 is attached to each of the holes 212d. The filter 220 may be detachably attached to the bottom plate 212.

For example, as the filter 220, a mesh-like filter that can be used repeatedly is used, but the filter 220 is not limited thereto. The filter 220 may be a non-woven fabric or may be made of another material. For example, the filter 220 may be metal. For example, the filter 220 may be a chemical fiber. For example, when the shape of the filter 220 is a mesh shape, the processing chips adhering to the filter 220 can be efficiently washed. In this case, the filter 220 is washed by, for example, the wash water injection unit 550 described later. For example, the size of the mesh of the filter 220 may be determined according to the size of the processing chips accumulated inside the dehydration tank 211 without passing through the filter 220. In addition, by disposing the region of the filter 220 so as to extend to the side wall 211a of the dehydration tank 211, water in the vicinity of the side wall 211a will pass through the filter 220. Accordingly, the processing chips accumulated in the dehydration tank 211 can be efficiently dehydrated.

<Grinding Water Introduction Unit>

The grinding water introduction pipe 150 for introducing the grinding water from the processing device 1 into the dehydration tank 211 passes through the opening of the upper wall 211b of the dehydration tank 211. In other words, the grinding water introduction pipe 150 extends inward from the upper portion of the dehydration tank 211. An introduction port 150a of the grinding water introduction pipe 150 is arranged on the top plate 205, and the drainage hose 15 extending from the processing device 1 is connected to the introduction port 150a. An internal pipe 150b of the grinding water introduction pipe 150 that enters the inside of the dehydration tank 211 is thinner than the introduction port 150a. Further, a tip end pipe 150c further extending from the internal pipe 150b is bent toward an interior side of the side wall 211a such that the grinding water is discharged toward the interior side of the side wall 211a. In other words, a discharge port 151 of the grinding water introduction pipe 150 is directed toward the interior side of the side wall 211a such that the advancing direction of the grinding water dropped by gravity is oriented toward the interior side of the side wall 211a. Accordingly, the grinding water is directed toward the interior side of the side wall 211a of the dehydration tank 211 by utilizing the force of the natural drop of the grinding water without using a pump. In addition, it is possible to suppress the direct entrance of the grinding water discharged from the grinding water introduction pipe 150 to the opening 230 for ejecting the processing chips. Further, since the cross-sectional area at the discharge port 151 is smaller than the cross-sectional area at the introduction port 150a, the force of the grinding water emitted from the discharge port 151 and oriented toward the interior side of the side wall 211a is gained, the grinding water is less likely to flow into the opening 230 for ejecting the processing chips, and the centrifugal separation by rotation of the dehydration tank 211 can be performed efficiently. In addition, it is needless to say that a pump may be provided in order to give a force to the grinding water discharged from the discharge port 151.

Further, the discharge port 151 may be arranged on the side wall 211a side of the opening 230 for ejecting the processing chips. Accordingly, it is further suppressed that the grinding water enters the opening 230.

Figure 4:
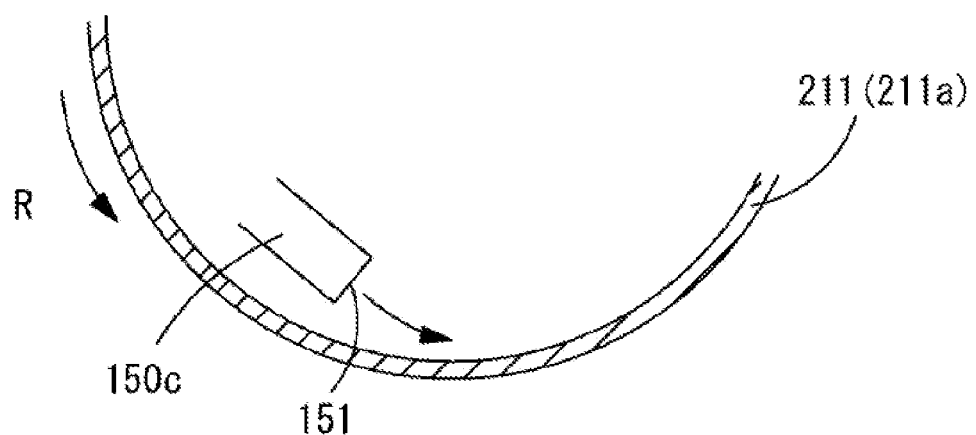
FIG. 4 is a view illustrating an example of a direction of a drainage hole of a grinding water introduction pipe.

Further, as illustrated in FIG. 4, the direction of the discharge port 151 may not be the normal direction of the side wall 211a, but may be a direction in which the discharged grinding water heads along the rotation direction R of the dehydration tank 211. Accordingly, when the grinding water discharged from the discharge port 151 collides with the side wall 211a of the rotating dehydration tank 211, the accumulated processing chips, or the grinding water collected on the side wall 211a side, bouncing and scattering are suppressed. As a result, the entrance of the grinding water into the opening 230 for ejecting the processing chips is further suppressed.

Further, the discharge port 151 of the grinding water introduction pipe 150 is arranged above the center of the dehydration tank 211. Accordingly, the distance until the grinding water discharged from the discharge port 151 reaches the bottom plate 212 of the dehydration tank 211 becomes long, and the grinding water is easily subjected to the centrifugal force due to the rotation of the dehydration tank 211. Accordingly, the processing chips and the water which are mixed with the grinding water can be separated more efficiently.

<Scraping Mechanism Unit>

The scraping mechanism unit 600 includes the scraper 601 for scraping out the processing chips accumulated on the interior side of the side wall 211a; and the moving mechanism 602 for moving the scraper 601 between the retracted position and the operating position.

The scraper 601 is disposed inside the dehydration tank 211. For example, the scraper 601 has a flat plate shape, and the cutting edge portion 601a of the scraper 601 is formed in a shape along the interior side of the side wall 211a. In addition, the scraper 601 is not limited to a flat plate shape, and may have a shape capable of scraping out the processing chips. A rotation shaft 604 extending above the dehydration tank 211 is attached to the scraper 601. The rotation shaft 604 is rotatably held by a holding unit 605 mounted on the top plate 205. Then, the rotation shaft 604 is rotated (forward rotation, reverse rotation) by a motor 603 via the rotation transmission mechanism (belt, pulley, gear, and the like). The motor 603 is attached onto the top plate 205. In the example, the moving mechanism 602 is configured with the rotation shaft 604, the holding unit 605, the motor 603, and the like. In addition, the moving mechanism 602 of the scraper 601 is not limited to the above-described rotation, and may be a linear movement.

Figure 5:
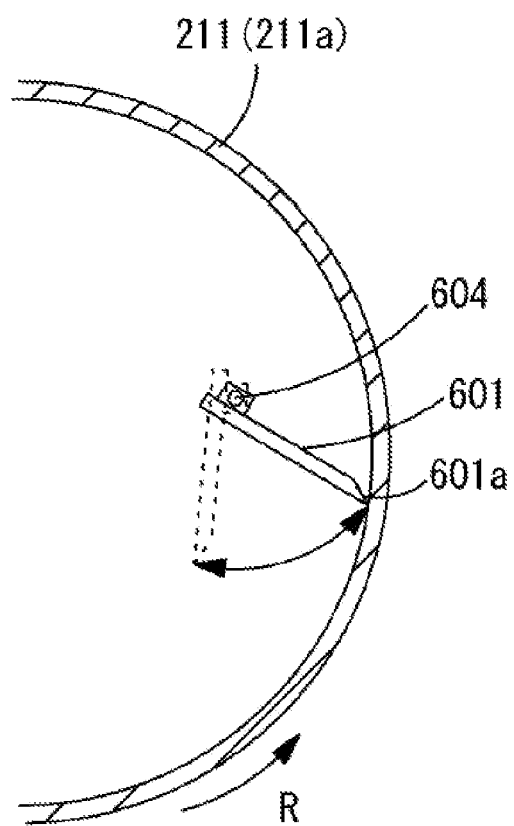
FIG. 5 is a view describing driving of a scraper.

For example, the retracted position of the scraper 601 is set to be a position where the scraper 601 does not hit the side wall 211a and the accumulated processing chips as illustrated by the dotted line in FIG. 5 when the dehydration tank 211 is rotated to centrifugally separate the grinding water and the processing chips. In a case of scraping out the processing chips accumulated on the interior side of the side wall 211a, the scraper 601 is moved to the operating position where the cutting edge portion 601a of the scraper 601 is pressed against the side wall 211a as illustrated by the solid line in FIG. 5.

<Water Receiving Unit>

The water receiving unit 500 is disposed under the centrifugal separator 210. The water receiving unit 500 is attached to, for example, the column 203. The water receiving unit 500 is positioned below the filter 220 to receive the water that has passed through the filter 220 at the bottom portion of the dehydration tank 211. For example, as the water receiving unit 500, a U-shaped flow path is arranged in an annular shape. For example, the water receiving unit 500 is disposed corresponding to the arrangement of the filter. In other words, the water receiving unit 500 has a water receiving region capable of receiving the water that passes through the filter 220 and is dropped. The water receiving unit 500 is disposed outside the opening 230. For example, a side wall 500a on the inside (rotation shaft 215 side) of the water receiving unit 500 is arranged outside the opening 230 formed on the bottom plate 212. Accordingly, the processing chips that pass through the opening 230 are prevented from being mixed into the water receiving unit 500. Further, the water that has passed through the filter 220 is prevented from flowing into the chips receiving unit 400. Further, the water that has passed through the filter 220 can flow into the water receiving unit 500. Further, the upper end of a side wall 500b on the outer side of the water receiving unit 500 is provided at a position higher than the bottom portion (bottom plate 212) of the dehydration tank 211. Accordingly, it is possible to suppress the outflow of the water that has passed through the filter 220 from the water receiving unit 500 to the outside of the centrifugal separator 210.

In addition, regarding the arrangement of the water receiving unit 500, the water receiving unit 500 may be disposed in a region for receiving water that has passed through the filter 220, that is, at least in a region other than the region where the processing chips scraped out by the scraping mechanism unit 600 pass through the opening 230. For example, the processing chips scraped out by the scraping mechanism unit 600 are mainly ejected from the vicinity of the position where the scraper 601 is disposed in the opening 230. Therefore, for example, at a position (for example, 180° opposite to the operating position of the scraper 601) away from the scraper 601, the water receiving unit 500 may be disposed at the part of the opening 230 outside the region through which the processing chips pass. Accordingly, while the entrance of the processing chips scraped out by the scraping mechanism unit 600 into the water receiving unit 500 is suppressed, the entrance of the grinding water introduced from the discharge port 151 of the grinding water introduction pipe 150 into the chips receiving unit 400 can be suppressed.

A drainage hole 501 for draining water is provided at a part of the bottom surface 502 of the water receiving unit 500. The water that has entered the water receiving unit 500 flows into the tank 81 from the drainage hole 501 through the flow path 510.

In addition, the bottom surface 502 of the water receiving unit 500 may be inclined toward the drainage hole 501. For example, the bottom surface 502 of the water receiving unit 500 is inclined such that 180 degrees opposite side of the drainage hole 501 is the highest. Accordingly, the grinding water flowing into the water receiving unit 500 can be efficiently drained from the drainage hole 501.

<Wash Water Injection Unit>

The wash water injection unit 550 is provided in the grinding water treatment device 200 for washing the filter 220 disposed at the bottom portion of the dehydration tank 211. In FIG. 1, the wash water injection unit 550 includes a tank 554 for storing wash water; a pump 551 for suctioning wash water; the nozzle 553 for injecting the wash water toward the filter 220 (refer to FIG. 2); and a pipe 552 that couples the pump 551 and the nozzle 553.

The nozzle 553 is provided at a position where the wash water is ejected from below the filter 220. In the example, the nozzle 553 is installed on the side wall 500b on the outside of the water receiving unit 500. The tip end port of the nozzle 553 is directed toward the filter 220 (that is, the bottom portion of the dehydration tank 211). In addition, the tip end port of the nozzle 553 may be provided so as to eject the wash water in the diagonally downward direction with respect to the filter 220 at a position avoiding the position where the water that has passed through the filter 220 is dropped. In this case, it is suppressed that the water that has passed through the filter 220 directly enters the tip end port of the nozzle 553 when the wash water is not injected. Accordingly, it is possible to suppress the clogging of the nozzle 553 due to fine processing chips that have passed through the filter 220. The mechanism for suppressing the clogging of the nozzle 553 is not limited to this. For example, the nozzle 553 may be provided with a mechanism which is positioned at the retracted position that is not affected by the water that has passed through the filter 220 during non-washing, and moves to the injection position where the wash water can be ejected toward the filter 220 during the washing. Otherwise, the nozzle 553 may be provided inside the dehydration tank 211. In this case, the nozzle 553 injects the wash water from above the filter 220. For example, the nozzle 553 may be attached to a member such as the scraper 601 or the like inside the dehydration tank 211.

At the time of washing the filter 220, the wash water stored in the tank 554 is suctioned by the pump 551 and injected from the nozzle 553 toward the filter 220 via the pipe 552. Accordingly, the clogging of the filter 220 is eliminated. In addition, the wash water may be tap water, and the pipe 552 may be connected to a water pipe instead of the tank 554.

<Chips Receiving Unit>

Below the opening 230, the chips receiving unit 400 that receives the processing chips scraped out by the scraping mechanism unit 600 is detachably provided. For example, the chips receiving unit 400 has a size capable of accommodating an amount larger than the amount of the processing chips that can be accumulated in the dehydration tank 211. Accordingly, the frequency of the work (disposal work) of taking out the processing chips performed by the operator can be reduced, and the troublesome of the operator can be alleviated. Further, a bag may be disposed in the chips receiving unit 400. Accordingly, the operator can dispose of the processing chips collected inside the bag together for each of the bags, and the burden on the operator can be reduced.

<Control Unit>

Figure 6:
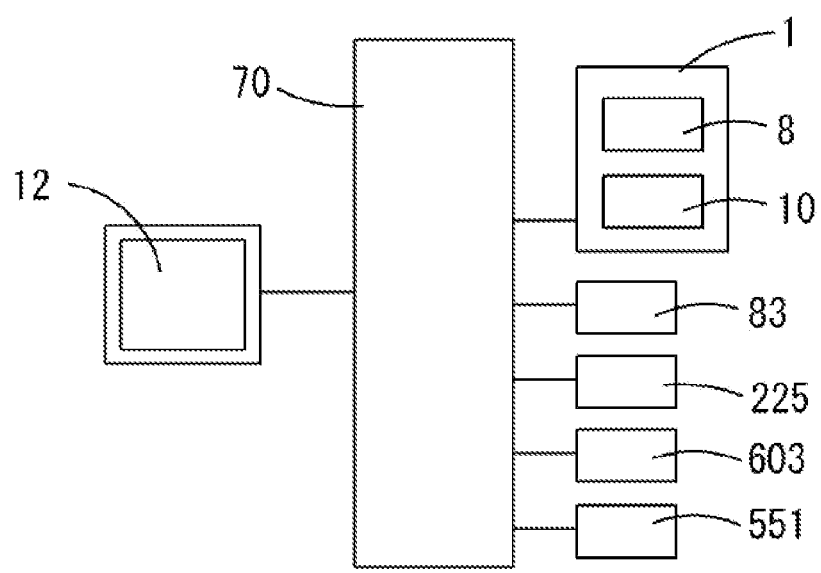
FIG. 6 is a block diagram illustrating a control system in the example.

FIG. 6 is a block diagram of a control system in the present example. The eyeglasses lens processing apparatus according to the present disclosure includes the processing device 1 and a control unit 70 for controlling the operation of the grinding water treatment device 200. It is needless to say that a control unit that controls the operation of the processing device 1 and a control unit that controls the operation of the grinding water treatment device 200 may be provided separately. The control unit 70 is coupled to each of the drive source included in the processing mechanism unit 10 of the processing device 1 and the lens refractive surface shape measuring unit 8. Further, the control unit 70 is coupled to each of the drive sources (the pump 83, motor 225, motor 603, and pump 551) included in the grinding water treatment device 200. Further, the control unit 70 is coupled to the monitor 12 used as an example of the notification unit.

<Notification Unit>

The grinding water treatment device 200 may include the monitor 12 used as an example of the notification unit notifying the operator of various types of information. The monitor 12 is connected to the control unit 70 (refer to FIG. 6). For example, in a case where the centrifugal separator 210 does not operate normally due to oscillation or the like, the control unit 70 can notify the operator of an error through the monitor 12 and request a response.

In the present example, the monitor 12 is also used as a monitor provided as the notification unit (and an input unit) in the processing device 1. It is needless to say that the notification unit may not be shared with the notification unit provided in the processing device 1, but may be provided separately.

In addition, the monitor 12 is an example of a member for notifying the operator, and is not limited thereto. For example, the notification unit may be a speaker. In this case, the grinding water treatment device 200 notifies the operator of the error by the voice of the speaker. Further, for example, the notification unit may be a lamp. In this case, the grinding water treatment device 200 notifies the operator of the error by lighting the lamp. Furthermore, the notification unit may be communication means with an external device such as a computer. In this case, the grinding water treatment device 200 notifies the operator of the error by the communication external device.

Further, for example, the control unit 70 may notify the operator of an instruction via the notification unit. For example, the control unit 70 may instruct the operator via the monitor 12 to take out the processing chips from the chips receiving unit 400 when the lens is processed by the processing device 1 a predetermined number of times.

<Operation>

The operations of the processing device and the grinding water treatment device having the above-described configuration will be described. When the lens LE is held by the lens chuck shafts 2R and 2L and the operation start signal of the processing device 1 is input, the control unit 70 first operates the lens refractive surface shape measuring unit 8 based on the previously acquired target lens shape, and measures the refractive surface shape of the lens LE. When the measurement of the refractive surface shape of the lens LE is completed, the control unit 70 then drives the pump 83 to control the drive of the carriage unit 3 while injecting the grinding water from the nozzle 11, and the peripheral edge of the lens LE is ground by the grindstone 5. The grinding water containing processing chips generated by processing the lens LE is guided to the centrifugal separator 210 by the drainage hose 15 connected to the bottom portion of the processing chamber 9.

Here, the control unit 70 drives the motor 225 so as to rotate the dehydration tank 211 of the centrifugal separator 210 at high speed based on a predetermined operation signal of the processing device 1 before supplying the grinding water (before driving the pump 83). Since the dehydration tank 211 is rotated at high speed before the grinding water from the processing device 1 flows into the dehydration tank 211, it is possible to reduce the inflow of the grinding water into the opening 230 for ejecting the processing chips. For example, as a predetermined operation signal, a trigger signal for starting the processing of the processing device 1 can be used. It is needless to say that the measurement start signal or the measurement end signal of the lens LE by the lens refractive surface shape measuring unit 8 may be used. Otherwise, as a predetermined operation signal, a signal for holding the lens LE on the lens chuck shafts 2R and 2L may be used.

The grinding water from the drainage hose 15 flows into the introduction port 150a of the grinding water introduction pipe 150, is guided to the inside of the dehydration tank 211 via the internal pipe 150b and the tip end pipe 150c, and is discharged from the discharge port 151 toward the interior side of the side wall 211a of the dehydration tank 211. In the present example, the grinding water introduction pipe 150 is provided such that the grinding water discharged from the discharge port 151 is oriented toward the interior side of the side wall 211a. Further, the discharge port 151 may be arranged on the side wall 211a side of the opening 230. Accordingly, it is suppressed that the grinding water directly enters the opening 230 provided on the bottom plate 212. Furthermore, since the cross-sectional area at the discharge port 151 is smaller than the cross-sectional area at the introduction port 150a, the force of the grinding water oriented toward the interior side of the side wall 211a is gained to suppress the entrance of the grinding water into the opening 230.

Further, since the discharge port 151 is directed in a direction in which the discharged grinding water heads along a rotation direction R of the dehydration tank 211 (refer to FIG. 4), bouncing and scattering are suppressed in a case where the grinding water discharged from the discharge port 151 collides with the side wall 211a, the accumulated processing chips and the like. Accordingly, it is further suppressed that the grinding water enters the opening 230.

In addition, a shutter that can be opened and closed may be provided between the opening 230 and the upper portion of the chips receiving unit 400. In this case, the shutter is closed except when the processing chips are removed by the scraping mechanism unit 600, and accordingly, it is possible to suppress the inflow of the grinding water into the chips receiving unit 400 from the opening 230.

Figure 7A:
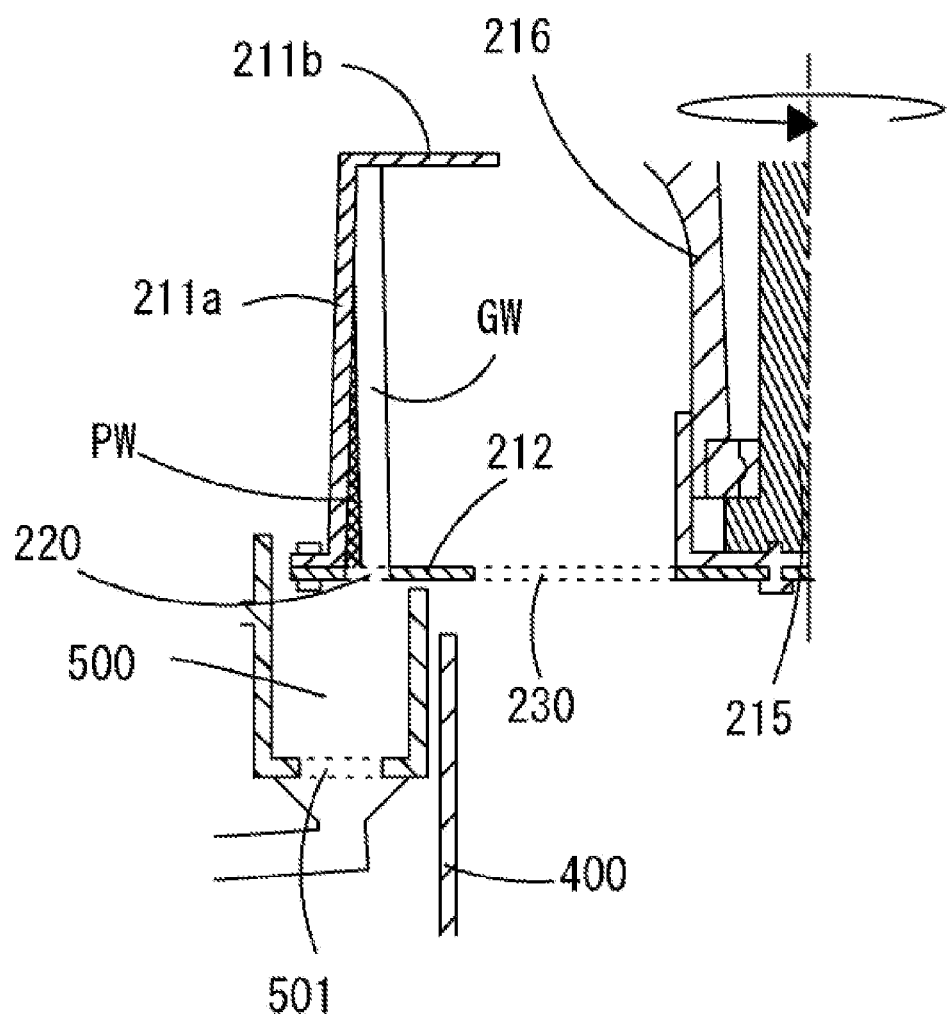
FIG. 7A is a view describing a positional relationship between processing chips and water in a case where centrifugal separation is performed.
Figure 7B:
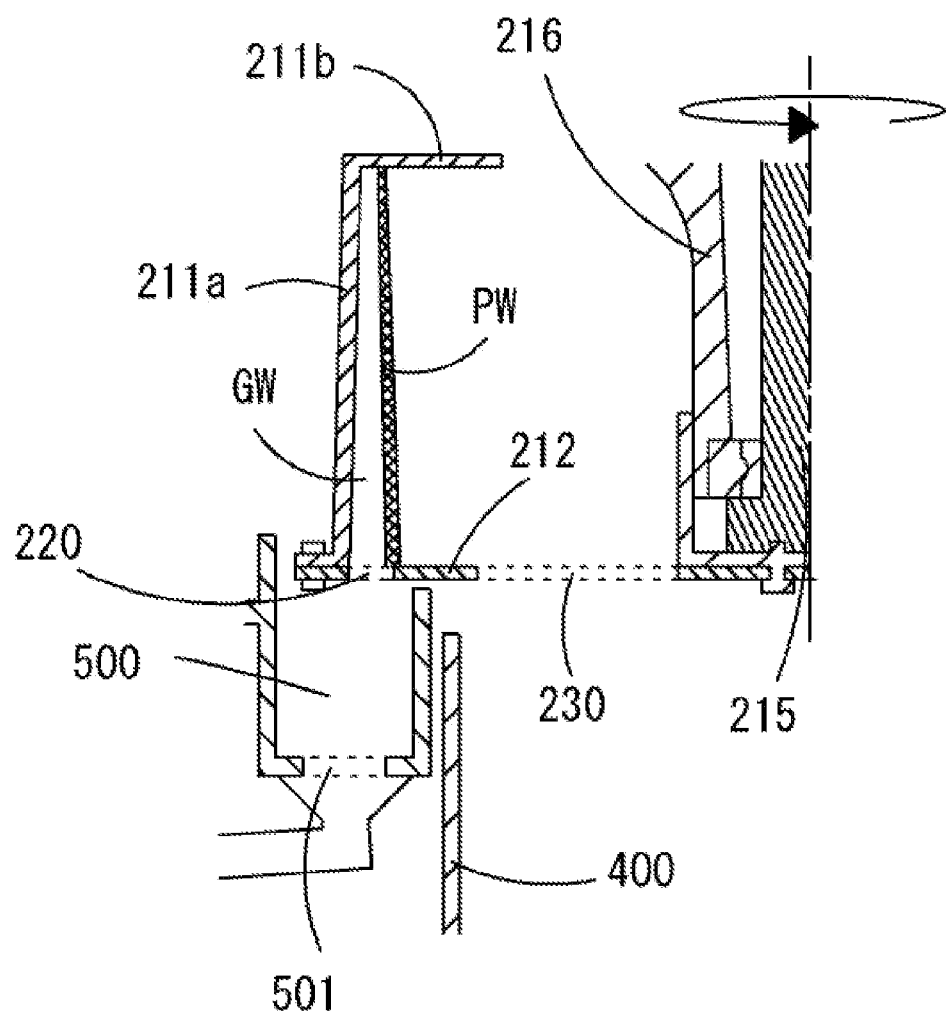
FIG. 7B is a view describing a positional relationship between processing chips and water in a case where centrifugal separation is performed.

The grinding water containing the processing chips introduced into the dehydration tank 211 is separated into the processing chips and water by the centrifugal force caused by the high-speed rotation of the dehydration tank 211. In a case where the processing chips contained in the grinding water is heavier than water, as illustrated in FIG. 7A, the processing chips and water are separated such that the processing chips are accumulated first on the side wall 211a side and the water is positioned on the inside (rotation shaft 215 side). In FIGS. 7A and 7B, PW indicates processing chips and GW indicates separated water.

Here, in a case where the filter 220 is not provided on the peripheral portion 212b of the bottom plate 212, when the rotation of the dehydration tank 211 stops (or when the dehydration tank 211 rotates at low speed), the water collected inside the dehydration tank 211 flows out from the opening 230 positioned inside the peripheral portion 212b and flows into the chips receiving unit 400.

On the other hand, in the present disclosure, by providing the filter 220 on the peripheral portion 212b of the bottom plate 212, it is suppressed that the water collected inside the dehydration tank 211 passes through the filter 220, is discharged to the outside of the dehydration tank 211, and enters the opening 230. In the present example, the water that has passed through the filter 220 enters the water receiving unit 500 provided outside the opening 230 and is reused as grinding water.

Further, it has been newly found by the present inventor that there is a case where it is difficult to separate the processing chips and water depending on the material of the lens LE, and the processing chips are lighter than water. The processing chips lighter than water are generated, for example, in a case where the material of the lens LE is thermoplastic such as polycarbonate. Polycarbonate is heavier than water in a state before processing, but it is considered that the processing chips ground by the grindstone 5 are softened by the heat during processing and contain air, and are lighter than water. In a case where the processing chips are lighter than water, water (including a case of grinding water in which the processing chips are not completely separated) is positioned on the side wall 211a side as illustrated in FIG. 7B by centrifugal separation by rotation of the dehydration tank 211, and the processing chips will be positioned inside (the rotation shaft 215 side).

Here, similar to the description above, in a case where the filter 220 is not provided on the peripheral portion 212b of the bottom plate 212, when the rotation of the dehydration tank 211 stops (or when the dehydration tank 211 rotates at low speed), the processing chips flow out from the opening 230 together with the water collected inside the dehydration tank 211. In other words, the grinding water containing the processing chips that have not been centrifugally separated flows into the chips receiving unit 400.

On the other hand, in the present disclosure, by providing the filter 220 on the peripheral portion 212b of the bottom plate 212, the water positioned further on the side wall 211a side than the processing chips passes through the filter 220 and is discharged to the outside of the dehydration tank 211. Accordingly, only the processing chips are accumulated inside the dehydration tank 211.

The control unit 70 does not stop the rotation of the dehydration tank 211 immediately after the processing of the lens LE is completed and the supply of the grinding water from the nozzle 11 is stopped, but the drive of the motor 225 is stopped after a certain period of time after the processing of the lens LE is completed, and the rotation of the dehydration tank 211 is stopped. Even after the processing of the lens LE is completed, the dehydration tank 211 is rotated to promote the dehydration of the processing chips accumulated inside the dehydration tank 211.

The processing chips accumulated inside the dehydration tank 211 are ejected from the dehydration tank 211 by operating the scraping mechanism unit 600 by the control unit 70. In addition, the control unit 70 does not operate the scraping mechanism unit 600 every time the processing of one lens LE is completed, but may operate the scraping mechanism unit 600 when the processing amount of the lens LE reaches a predetermined reference. Accordingly, the processing of the plurality of lenses LE can be continuously and efficiently performed. In addition, the predetermined reference of the processing amount is determined based on, for example, at least one of the number of processed lenses LE, the processing time of the lens LE, and the amount of grinding water used. It is needless to say that the predetermined reference of the processing amount is not limited to these, and various information can be used. In addition, in a case where the control unit 70 is provided separately from the control unit of the processing device 1, information from the control unit of the processing device 1 is transmitted to the control unit 70.

When the processing amount of the lens LE reaches a predetermined reference, the control unit 70 drives the motor 225 such that the rotation speed of the dehydration tank 211 is lower than the rotation speed at the time of centrifugal separation of the grinding water. Further, the control unit 70 drives the motor 603 and moves the scraper 601 placed at the retracted position to the operating position (the position where the cutting edge portion 601a is in contact with the side wall 211a) (refer to FIG. 5). In a state where the scraper 601 is positioned at the operating position, the dehydration tank 211 is rotated a plurality of times or for a certain period of time, and accordingly, the processing chips accumulated on the interior side of the side wall 211a are scraped off by the scraper 601 and dropped, and are ejected to the outside of the dehydration tank 211 from the opening 230 provided on the bottom plate 212. The processing chips ejected through the opening 230 is received by the chips receiving unit 400. In addition, when the work of removing the processing chips accumulated on the interior side of the side wall 211a is completed, the control unit 70 controls the drive of the motor 603 and moves the scraper 601 to the retracted position.

In addition, the control unit 70 may control the operation of the processing device 1 in a case where the processing chips are removed by the grinding water treatment device 200. For example, while the processing chips are being removed, the lens processing operation of the processing device 1 may be stopped such that the grinding water does not flow into the dehydration tank 211. In this case, the control unit 70 may notify the operator via the monitor 12 that the processing chips are being removed.

As described above, the processing chips accumulated inside the dehydration tank 211 are automatically ejected to the outside of the dehydration tank 211 by the control unit 70 operating the scraping mechanism unit 600, and thus, there is no troublesome for the operator to take out the processing chips. Further, the scraping time of the processing chips by the operation of the scraping mechanism unit 600 may be shorter than the processing time of one lens LE. Accordingly, the processing efficiency of the lens LE is not significantly reduced even in the continuous processing of the lens LE at the processing center (lens processing factory that concentrates the processing of eyeglasses lenses). Further, since the amount of the processing chips that can be stored in the chips receiving unit 400 can be larger than the amount of the processing chips accumulated in the dehydration tank 211, the operator can efficiently dispose of the processing chips collectively without increasing the size of the dehydration tank 211.

The control unit 70 operates the wash water injection unit 550 after removing the processing chips accumulated in the dehydration tank 211 by the scraping mechanism unit 600. The control unit 70 rotates the dehydration tank 211 while driving the pump 551 to inject the wash water from the nozzle 553 toward the filter 220. For example, the control unit 70 rotates the dehydration tank 211 a plurality of times or for a certain period of time. Accordingly, even in a case where the filter 220 is clogged with the processing chips, the clogging of the filter 220 is eliminated and the filter 220 can be used repeatedly.

In addition, the operation of the wash water injection unit 550 was not executed each time the processing chips in the dehydration tank 211 was removed by the scraping mechanism unit 600, but the operation of the scraping mechanism unit 600 may be performed a plurality of times. In this case, since the time for stopping the lens processing by the processing device 1 by the operation of the wash water injection unit 550 is reduced, the lens LE can be efficiently processed at the processing center.

In the operation of the grinding water treatment device 200 as described above, in a case where the centrifugal separator 210 does not operate normally due to oscillation or the like, the control unit 70 displays an error on the monitor 12 and notifies the operator of the abnormality of the centrifugal separator 210. In this case, the monitor 12 included in the processing device 1 may also be used. In a case where the centrifugal separator 210 is accommodated inside the table 20, the operator usually does not directly observe the centrifugal separator 210 while the centrifugal separator 210 is in operation. Therefore, there is a case where the operator does not notice the abnormality of the centrifugal separator 210. The processing device 1 is mounted on the table 20, and the operator can observe the monitor 12 of the processing device 1 even while the centrifugal separator 210 is in operation. Accordingly, the operator can easily know the abnormality of the centrifugal separator 210.

Second Example

The second example is an example in which the grinding water introduction unit is mainly different from that of the first example. In the second example, due to the different configuration of the grinding water introduction unit, the dehydration tank 211 of the centrifugal separator 210 of the first example, the mechanism for rotating the dehydration tank 211, the scraping mechanism unit 600, and the like have a partially different configuration. Hereinafter, the grinding water treatment device according to the second example will be described with reference to FIGS. 8, 9A, and 9B. In addition, the components having the same functions as those in the first example will be given the same reference numerals, and the detailed description thereof will be omitted. Further, in the following, the differences from the first example will be mainly described.

<Centrifugal Separator>

FIG. 8 is a view describing a configuration of the grinding water treatment device 200 according to the second example. The dehydration tank 211B of the centrifugal separator 210B included in the grinding water treatment device 200 is rotatably supported by the support mechanism 201. The base 206B is fixed to the four columns 203 of the support mechanism 201. The dehydration tank 211B is rotated by the rotation unit 217B. The rotation unit 217B includes the rotation shaft 215B of the dehydration tank 211B and the motor 225 (refer to FIG. 6) as an example of a drive source. The rotation shaft 215B is rotatably held by the holding member 216B. The holding member 216B is disposed on the base 206B and fixed to the base 206B. The rotation shaft 215B is rotated by the motor 225 (the motor 225 is not illustrated in FIG. 8) attached under the base 206B.

The side wall 211Ba of the dehydration tank 211B has the lower first side wall 211BaA and the second side wall 211BaB provided on the first side wall 211BaA. The first side wall 211BaA and the second side wall 211BaB may be integrally formed. The first side wall 211BaA has a cylindrical surface or a conical surface of which the upper diameter is smaller than the lower diameter. The second side wall 211BaB has a conical surface of which the upper diameter is smaller than the lower diameter. In addition, an angle β formed by the conical surface of the second side wall 211BaB with respect to the vertical direction is larger than an angle α formed by the conical surface of the first side wall 211BaA with respect to the vertical direction. For example, the angle α is formed at 0 to 10 degrees, and the angle β is formed at 20 to 50 degrees. In addition, the upper end of the first side wall 211BaA and the lower end of the second side wall 211BaB are formed so as to be continuously connected with the same diameter so as not to cause a step. The upper wall 211Bb of the dehydration tank 211B is formed on the second side wall 211BaB.

Similar to the first example, a bottom plate 212B is attached to the bottom portion of the side wall 211Ba. The bottom plate 212B is provided with the opening 230 for ejecting the processing chips scraped out by the scraping mechanism unit 600B to the outside of the dehydration tank 211B. In addition, in the centrifugal separator 210B of the second example, the coupling member 162B (details will be described later) for coupling the rotation shaft 215B and the dehydration tank 211B is provided on the upper portion of the rotation shaft 215B. Therefore, the bottom plate 212B omits the center portion 212a of the bottom plate 212 and the four coupling units 212c illustrated in FIG. 3 (the explanatory view of the bottom plate 212B is omitted, and FIG. 3 is used). Since the bottom plate 212B does not have the coupling unit 212c, it is possible to avoid the inconvenience that the processing chips that are dropped when the processing chips are scraped out by the scraping mechanism unit 600B are accumulated on the coupling unit 212c.

On the bottom plate 212B, similar to FIG. 3, the peripheral portion 212b, which is the outer region of the opening 230, is provided with the filter 220 for allowing the water separated from the grinding water to pass therethrough by the rotation of the dehydration tank 211 and discharging the water to the outside of the dehydration tank 211.

In addition, in the second example, since the motor 225 for rotating the rotation shaft 215B and the rotation transmission mechanism (not illustrated) are attached under the dehydration tank 211B, a waterproof cover (not illustrated) is disposed thereon. Further, the base 206B is provided with a hole 207B for allowing the processing chips that are dropped to pass therethrough when the processing chips are scraped out by the scraping mechanism unit 600B.

<Grinding Water Introduction Unit>

On the rotation shaft 215B of the dehydration tank 211B, the grinding water receiving unit 153B that configures the grinding water introduction unit 150B for introducing the grinding water from the processing device 1 into the dehydration tank 211B is disposed. The grinding water receiving unit 153B is disposed inside the dehydration tank 211B, and is rotated in the same direction as the dehydration tank 211B by the rotation unit 217B. In the second example, the rotation unit 217B is shared with the rotation unit that rotates the dehydration tank 211B. The rotation unit 217B rotates the grinding water receiving unit 153B integrally with the dehydration tank 211B. On the outer periphery of the grinding water receiving unit 153B, the discharge opening 160B for discharging the grinding water toward an interior side of the side wall 211Ba (in the example, the second side wall 211BaB) of the dehydration tank 211B is provided.

Above the grinding water receiving unit 153B, an introduction port 150Ba for introducing the grinding water discharged from the processing device 1, that is, an introduction port 150Ba attached to a top plate 205B is provided. The top plate 205B is fixed to the four columns 203. The drainage hose 15 extending from the processing device 1 is connected to the introduction port 150Ba. For example, the introduction port 150Ba is a circular pipe and is arranged concentrically with the rotation shaft 215B. Further, a lid member 214B is attached onto the upper wall 211Bb of the dehydration tank 211B. The lid member 214B is formed with a hole into which the introduction port 150Ba is inserted, and is rotated together with the dehydration tank 211B. The lid member 214B reduces the outflow of the grinding water from the top of the dehydration tank 211B when the grinding water is introduced into the grinding water receiving unit 153B from the introduction port 150Ba. In addition, the lid member 214B may be integrally formed with the upper wall 211Bb.

Figure 9A:
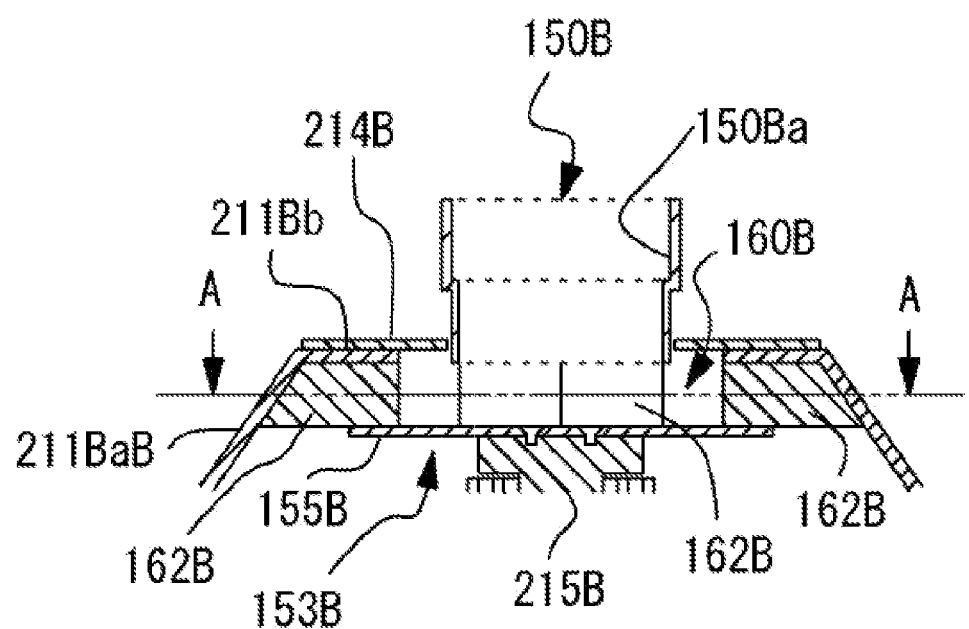
FIG. 9A is a view describing a configuration of a grinding water receiving unit.
Figure 9B:
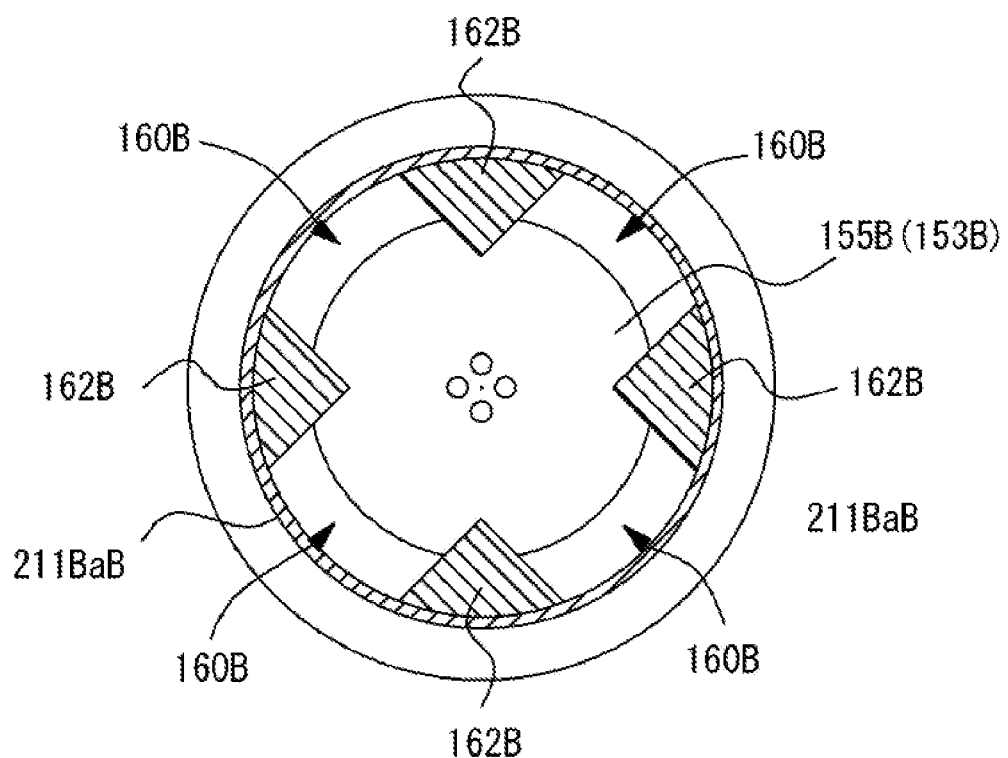
FIG. 9B is a view describing a configuration of the grinding water receiving unit.

FIGS. 9A and 9B are views describing a configuration of the grinding water receiving unit 153B. FIG. 9A is a view in the vicinity of the grinding water receiving unit 153B in FIG. 8, and FIG. 9B is a sectional view taken along the line A-A of FIG. 9A (sectional view seen from above). For example, the grinding water receiving unit 153B includes the bottomed water receiving plate 155B that receives the grinding water charged from the introduction port 150Ba. The water receiving plate 155B is attached onto the rotation shaft 215B. The water receiving plate 155B is rotated together with the rotation shaft 215B, and accordingly, the water receiving plate 155B is rotated integrally with the dehydration tank 211B. For example, the water receiving plate 155B is formed in a disk shape concentric with the rotation shaft 215B. Further, the height of the upper surface (surface receiving the grinding water) of the water receiving plate 155B is positioned above the first side wall 211BaA and between the heights of the second side wall 211BaB. For example, the upper surface of the water receiving plate 155B is positioned at the center of the height width of the second side wall 211BaB. Accordingly, the grinding water charged on the upper surface of the water receiving plate 155B is oriented toward the second side wall 211BaB when the grinding water is emitted from the water receiving plate 155B by the centrifugal force (detailed operation will be described later).

Further, for example, the water receiving plate 155B is formed in a disk shape having a diameter larger than the diameter of the introduction port 150Ba. In addition, the introduction port 150Ba is positioned on the water receiving plate 155B, and it is sufficient that the grinding water discharged from the processing device 1 can be introduced onto the water receiving plate 155B, and may not necessarily be arranged concentrically with the rotation shaft 215B. Further, the upper surface shape of the water receiving plate 155B is not limited to the horizontal plane shape. For example, the upper surface shape of the water receiving plate 155B may be a conical surface shape having a convex center portion. For example, the inclination of the conical surface with respect to the horizontal direction may be 40 degrees or less, and preferably 10 to 20 degrees. In this case, it is possible to suppress that the grinding water flowing from the introduction port 150Ba hits the conical surface of the water receiving plate 155B and is bounced and scattered upward, and the grinding water is easily directed in the lateral direction due to the action of the centrifugal force.

<Coupling Structure Between Dehydration Tank and Rotation Shaft>

Further, the centrifugal separator 210B is provided with the coupling member 162B for coupling the rotation shaft 215B and the dehydration tank 211B in order to rotate the dehydration tank 211B integrally with the rotation shaft 215B. In the second example, a plurality (for example, four) of coupling members 162B for coupling the water receiving plate 155B and the dehydration tank 211B are provided between the water receiving plate 155B and the dehydration tank 211B. In other words, in the disclosure of the second example, the dehydration tank 211B and the water receiving plate 155B are rotated integrally with the rotation shaft 215B with the water receiving plate 155B interposed therebetween. In the disclosure of FIGS. 8, 9A, and 9B, the coupling member 162B is provided at a position where the upper surface of the water receiving plate 155B and the upper wall 211Bb (which may further include the second side wall 211BaB) are coupled. In addition, the discharge opening 160B for discharging the grinding water toward the interior side of the side wall 211Ba is formed between each of the plurality of coupling members 162B. In the disclosure of FIGS. 8, 9A, and 9B, the discharge opening 160B is provided so as to emit the grinding water in the horizontal direction, but may be provided so as to emit the grinding water in the diagonally upward direction.

<Scraping Mechanism Unit>

The scraping mechanism unit 600B includes the scraper 601 for scraping out the processing chips accumulated on the interior side of the side wall 211Ba. The moving mechanism 602B for moving the scraper 601 between the retracted position and the operating position uses the rotary moving mechanism in the first example, but uses the linear moving mechanism in the second example. The moving mechanism 602B is attached to the holding member 216B inside the dehydration tank 211B, and by linearly moving two support members 607B supporting the scraper 601 in the horizontal direction, the scraper 601 is moved between the retracted position and the operating position. The moving mechanism 602B includes the motor 603 (refer to FIG. 6) which is an example of a drive source for moving the support member 607B.

In addition, similar to the first example, the chips receiving unit (bucket) 400 for receiving the processing chips is detachably disposed at the lower portion of the centrifugal separator 210. In the second example, the base 206B to which the holding member 216B is fixed is disposed between the centrifugal separator 210 and the chips receiving unit 400, but the hole 207B for allowing the processing chips to pass therethrough may be formed on the base 206B so as to correspond to the retracted position and the operating position of the scraper 601.

Operation of Second Example

The operation of the grinding water treatment device according to the second example will be described. Here, the operation of the points different from those of the first example will be mainly described.

The grinding water from the processing device 1 is introduced (charged) into the grinding water receiving unit 153B from the introduction port 150Ba via the drainage hose 15. In addition, before the grinding water is introduced into the grinding water receiving unit 153B, the water receiving plate 155B of the grinding water receiving unit 153B is rotated at high speed together with the dehydration tank 211B based on a predetermined operation signal of the processing device 1. The grinding water introduced from the introduction port 150Ba is received by the water receiving plate 155B. At this time, since the water receiving plate 155B is rotated in the same direction as the dehydration tank 211, the centrifugal force also acts on the grinding water received by the water receiving plate 155B, and the grinding water is sprinkled in the radial direction. Then, the grinding water is repelled from the discharge opening 160B and is vigorously discharged (emitted) to the outside of the grinding water receiving unit 153B, and at the same time, a force acts on the grinding water in the rotation direction of the water receiving plate 155B. In other words, in a case where the water receiving plate 155B is rotated integrally with the dehydration tank 211, substantially the same rotational force acts on the grinding water discharged from the discharge opening 160B in the same rotation direction as the rotation of the dehydration tank 211B. The water receiving plate 155B is rotated at high speed at the same rotation speed as the dehydration tank 211B for separating the grinding water into processing chips and water, and accordingly, the grinding water is discharged from the discharge opening 160B at speed faster than the falling speed due to gravity in the first example.

Here, in the grinding water introduction unit 150B of the second example, as described above, substantially the same rotational force acts on the grinding water discharged from the discharge opening 160B in the same direction as the rotation of the dehydration tank 211B. Therefore, when the grinding water collides with the side wall 211Ba (the wall of the grinding water collected in the side wall 211a) that is rotated at high speed, the generation of splashes of the grinding water is further suppressed with respect to the configuration of the grinding water introduction pipe 150 of the first example. In addition, by suppressing the generation of splashes of the grinding water, the possibility that the unfiltered grinding water flows out from the opening 230 for ejecting the processing chips is reduced, and the possibility that the grinding water flows into the chips receiving unit 400 is also reduced. Further, by suppressing the generation of splashes of the grinding water, the inhibition of the centrifugal separation between the processing chips and water related to the grinding water accumulated on the side wall 211Ba can be further suppressed with respect to the configuration of the first example. Accordingly, the processing chips and water are efficiently centrifugally separated by the dehydration tank 211B.

In addition, furthermore, in an example of the side wall 211Ba of the dehydration tank 211B disclosed in FIG. 8, the angle β formed by the conical surface of the second side wall 211BaB with respect to the vertical direction is larger than the angle α formed by the conical surface of the first side wall 211BaA with respect to the vertical direction. Further, the height of the upper surface (surface receiving the grinding water) of the water receiving plate 155B is positioned above the first side wall 211BaA. Therefore, the grinding water discharged from the discharge opening 160B tends to collide with the second side wall 211BaB. The grinding water that has collided with the second side wall 211BaB flows toward the first side wall 211BaA having a diameter larger than that of the second side wall 211BaB due to the centrifugal force of the dehydration tank 211B. Accordingly, the processing chips and water are also efficiently separated by the dehydration tank 211B, and the processing chips are deposited on the first side wall 211BaA side.

Further, in a case where the amount of grinding water introduced from the introduction port 150Ba is small, in the disclosure of the first example, the force of the grinding water toward the interior side of the side wall 211a side is weak (the speed is slow), and the grinding water tends to fall to the bottom plate 212 side. On the other hand, in the grinding water introduction unit 150B of the second example, even in a case where the amount of grinding water is small because the centrifugal force also acts on the grinding water received by the water receiving plate 155B flowing in from the introduction port 150Ba, the force of the grinding water discharged from the discharge opening 160B and blown toward the interior side of the side wall 211Ba is strong (the speed is high), and the grinding water is suppressed from falling directly toward the bottom plate 212B. Accordingly, even in a case where the amount of grinding water is small, the processing chips and water can be efficiently separated by the dehydration tank 211B that is rotated at high speed.

The grinding water collected inside the dehydration tank 211B (the interior side of the side wall 211Ba) is separated into the processing chips and water by the centrifugal force of the dehydration tank 211B. Then, as illustrated in FIGS. 7A and 7B, the water separated from the grinding water passes through the filter 220 provided at the bottom portion of the dehydration tank 211B and is discharged to the outside of the dehydration tank 211B. Accordingly, only the processing chips are accumulated inside the dehydration tank 211B.

When the processing amount of the lens LE reaches a predetermined reference, the scraping mechanism unit 600B is driven by the control of the control unit 70, and accordingly, the scraper 601 placed at the retracted position is moved to the operating position. In this state, as the dehydration tank 211B is rotated, the processing chips accumulated on the interior side of the first side wall 211BaA are scraped off by the scraper 601 and dropped, and are ejected to the outside of the dehydration tank 211B from the opening 230 provided on the bottom plate 212B.

The grinding water treatment device 200 of the second example includes the water receiving unit 500 and the wash water injection unit 550, but the operation thereof is basically the same as that of the first example and is omitted.

Modification Example of Second Example

The arrangement of the coupling member 162B disclosed in FIGS. 9A and 9B is not limited to the above as long as the dehydration tank 211B can be rotated integrally with the rotation shaft 215B. For example, the coupling member 162B may be attached to the rotation shaft 215B. Further, the coupling member 162B may be separated from the grinding water receiving unit 153B (water receiving plate 155B). For example, similar to the first example, the coupling member 162B may be provided on the bottom plate 212B of the dehydration tank 211B. In a case where the coupling member 162B is separated from the grinding water receiving unit 153B, the discharge opening 160B can be provided on the entire circumference of the water receiving plate 155B. As illustrated in FIGS. 9A and 9B, in a case where the coupling member 162B is provided on the water receiving plate 155B, the coupling member 162B serves as a barrier, and there is a possibility that the grinding chips mixed into the grinding water stay on the water receiving plate 155B. On the other hand, when the discharge opening 160B is provided on the entire circumference of the water receiving plate 155B, it is possible to further reduce the staying of grinding chips on the water receiving plate 155B.

Although the typical examples of the present disclosure have been described above, the present disclosure is not limited to the examples illustrated here, and various modifications can be made within the scope of making the technical idea of the present disclosure the same.

What is claimed is:

1. A grinding water treatment device for treatment of grinding water used in eyeglasses lens processing, comprising:
 a centrifugal separator that includes a dehydration tank into which grinding water used in a processing device of an eyeglasses lens is introduced, and separates the grinding water into water and processing chips by rotation of the dehydration tank;

a scraping unit that scrapes out the processing chips accumulated on a side wall inside the dehydration tank;

an opening provided in the dehydration tank and through which the processing chips scraped out by the scraping unit are ejected to an outside of the dehydration tank; and a filter provided in a region outside of the opening, and through which the water separated from the grinding water by rotation of the dehydration tank passes to allow the processing chips to be present inside the dehydration tank, wherein the opening is formed at a bottom portion of the dehydration tank such that the dropped processing chips scraped out by the scraping unit pass through the opening, the filter is provided in a bottom plate of the dehydration tank at the bottom portion of the dehydration tank in the region outside the opening, the filter is arranged between the opening and the side wall inside the dehydration tank, and the bottom portion of the dehydration tank is jointed to the side wall inside the dehydration tank.

2. The grinding water treatment device according to claim 1, further comprising:

a grinding water introducing unit that introduces the grinding water from the processing device into the dehydration tank, and discharges the grinding water toward the side wall inside the dehydration tank.

3. The grinding water treatment device according to claim 2, wherein the grinding water introducing unit includes a grinding water introduction pipe for introducing the grinding water into the dehydration tank, and a discharge port of the water introduction pipe is arranged on the side wall side of the dehydration tank with respect to the opening provided in the dehydration tank.

4. The grinding water treatment device according to claim 3, wherein the grinding water introduction pipe extends from an upper portion of the dehydration tank to an inside in order to introduce the grinding water discharged from the processing device into the dehydration tank, and the discharge port of the grinding water introduction pipe is directed toward the side wall inside the dehydration tank such that the grinding water is directed toward the side wall inside the dehydration tank.

5. The grinding water treatment device according to claim 3, wherein a cross-sectional area of the grinding water introduction pipe at the discharge port is smaller than a cross-sectional area of the grinding water introduction pipe at an introduction port.

6. The grinding water treatment device according to claim 3, wherein the discharge port of the grinding water introduction pipe is directed such that the discharged grinding water heads along a rotation direction of the dehydration tank.

7. The grinding water treatment device according to claim 2, wherein the grinding water introducing unit includes:

a grinding water receiving unit disposed inside the dehydration tank, and in which the grinding water discharged from the processing device is introduced; and a rotation unit that rotates the grinding water receiving unit in a direction identical to a rotation direction of the dehydration tank, and a discharge opening for discharging the grinding water toward the side wall inside the dehydration tank is provided on an outer periphery of the grinding water receiving unit.

8. The grinding water treatment device according to claim 7, wherein the rotation unit is shared with a rotation unit that rotates the dehydration tank, and the grinding water receiving unit is rotated integrally with the dehydration tank.

9. The grinding water treatment device according to claim 8, wherein the grinding water receiving unit is attached to a rotation shaft of the dehydration tank.

10. The grinding water treatment device according to claim 7, wherein the grinding water receiving unit includes a bottomed water receiving plate that receives the grinding water discharged from the processing device, a plurality of coupling members for coupling the water receiving plate and the dehydration tank is provided, and the discharge opening is formed between each of the plurality of coupling members.

11. The grinding water treatment device according to claim 7, wherein the dehydration tank has a first side wall provided at a lower part of the dehydration tank and a second side wall provided above the first side wall, the first side wall has a cylindrical surface or a conical surface of which an upper diameter is smaller than a lower diameter, the second side wall has a conical surface of which an upper diameter is smaller than a lower diameter, and an angle formed by the conical surface of the second side wall with respect to a vertical direction is larger than an angle formed by the cylindrical surface or the conical surface of the first side wall with respect to the vertical direction, and the discharge opening is positioned above the first side wall.

* * * * *